(12) United States Patent
Ikefuji et al.

(10) Patent No.: US 6,654,466 B1
(45) Date of Patent: Nov. 25, 2003

(54) DATA COMMUNICATION EQUIPMENT, DATA COMMUNICATION SYSTEM, AND DATA COMMUNICATION METHOD

(75) Inventors: Yoshihiro Ikefuji, Kyoto (JP); Satoshi Yoshioka, Kyoto (JP)

(73) Assignee: Rohm Co., Ltd., Kyobo (JP)

( * ) Notice: Subject to any disclaimer, the term of this patent is extended or adjusted under 35 U.S.C. 154(b) by 0 days.

(21) Appl. No.: 09/402,484

(22) PCT Filed: Apr. 15, 1998

(86) PCT No.: PCT/JP98/01733

§ 371 (c)(1),
(2), (4) Date: Oct. 14, 1999

(87) PCT Pub. No.: WO98/47263

PCT Pub. Date: Oct. 22, 1998

(30) Foreign Application Priority Data

Apr. 17, 1997 (JP) ............................................. 9/100400

(51) Int. Cl.⁷ ................................................ G06F 1/24
(52) U.S. Cl. ...................................... 380/270; 380/255
(58) Field of Search ................................. 380/270, 255

(56) References Cited

U.S. PATENT DOCUMENTS 4,978,944 A * 12/1990 Andros et al. ............. 340/7.41

FOREIGN PATENT DOCUMENTS

| EP | 0722155 A1 | 7/1996 |
|---|---|---|
| JP | 56-31251 | 3/1981 |
| JP | 1-174142 | 7/1989 |
| JP | 1-253678 | 10/1989 |
| JP | 4-200126 | 7/1992 |
| JP | 4-269030 | 9/1992 |
| JP | 6-93551 | 4/1994 |
| JP | 6-204999 | 7/1994 |
| JP | 6-216897 | 8/1994 |
| JP | 6-83551 | 10/1994 |
| JP | 7-287065 | 10/1995 |
| JP | 8-172378 | 7/1996 |
| JP | 8-191258 | 7/1996 |
| JP | 9-511886 | 11/1997 |
| JP | 10-65663 | 3/1998 |

* cited by examiner

Primary Examiner—Thomas R. Peeso
(74) Attorney, Agent, or Firm—Arent Fox Kintner Plotkin & Kahn, PLLC

(57) ABSTRACT

Data communication means (82) performs data communication and power transmission by utilizing electromagnetic waves. Conversion method designating means (88) is provided with output value measuring means (52) which measures the magnitude of the fluctuating output of a resonance circuit (40), and conversion method select means (100) which selects a conversion method to be executed in accordance with the obtained magnitude of the output of the resonance circuit (40). Data converting means (84) is provided with three conversion methods and performs conversion between original data and processed data by executing conversion in accordance with one of the conversion methods designated by the select means (100). The safety on security can thus be improved with a simple constitution.

36 Claims, 24 Drawing Sheets

AUTOMATIC ADJUSTMENT PROCESS

*FIG.16*

| J | $\phi$C | $\phi$B | $\phi$A | FAVORABLE FLAG |
|---|---|---|---|---|
| 1 | 0 | 0 | 0 | 0 |
| 2 | 1 | 0 | 0 | 0 |
| 3 | 1 | 1 | 0 | 0 |
| 4 | 1 | 1 | 1 | 0 |
| 5 | 1 | 1 | 1 | 1 |
| 6 | 1 | 1 | 1 | 0 |
| 7 | 1 | 1 | 0 | 0 |
| ⋮ | ⋮ | ⋮ | ⋮ | ⋮ |
| N | 0 | 0 | 0 | 0 |

DATA COMMUNICATION EQUIPMENT, DATA COMMUNICATION SYSTEM, AND DATA COMMUNICATION METHOD

TECHNICAL FIELD

The present invention relates to a data communication apparatus, a data communication system, and a data communication method, and particularly to an improvement in safety (on security).

BACKGROUND ART

Data communication systems using non-contact type IC cards have been utilized for transaction with prepaid cards, for automatic toll collecting at ski lifts and trains, and for automatic package control. FIG. 25 shows a configuration of a data communication system utilizing a non-contact type IC card. This system consists of a reader/writer 2 (placed at a ski lift gate, for example) and a non-contact IC card 20.

Reader/writer 2 transmits high-frequency carrier waves from an oscillation circuit 10 via an antenna 4, under the control of a control unit 8. When non-contact IC card 20 comes close to reader/writer 2, an antenna 24 of non-contact IC card 20 receives the high-frequency carrier waves. A power supplying circuit 28 converts the received high-frequency waves to direct-current power that is to be supplied to other circuit portions. Non-contact IC card 20 is thus activated when it approaches reader/writer 2. The power supplying circuit 28, a modulator/demodulator circuit 30, a control unit 32, and a non-volatile memory 34 are configured as an IC chip 36 to save space.

For data transmission from reader/writer 2 to non-contact IC card 20, a modulator/demodulator circuit 6 first modulates the high-frequency carrier waves under the control of control unit 8. In non-contact IC card 20, modulator/demodulator circuit 30 demodulates the modulated high-frequency carrier waves. Control unit 32 receives the demodulated data and performs necessary processes, such as rewriting the content of a non-volatile memory 34 and returning the data.

Data transmission in the opposite direction from non-contact IC card 20 to reader/writer 2 is also performed. Here, non-contact IC card 20 is not provided with an oscillation circuit. Thus, utilizing unmodulated, high-frequency carrier waves sent from reader/writer 2, modulator/demodulator 30 at non-contact IC card 20 changes impedance of a resonance circuit 22 on the card side. Reader/writer 2 regards this impedance change as an impedance change in a resonance circuit 12 on its own side, and detects and demodulates this impedance change by modulator/demodulator circuit 6. Control unit 8 receives the demodulated data and performs necessary processes.

When non-contact IC card 20 moves away from reader/writer 2, it is no longer provided with power, and thus, card 20 terminates its operation. Without the power supply, however, stored data are maintained because non-volatile memory 34 is used.

As described above, with the data communication system using IC card 20, it is possible to transmit data in a non-contact manner, without having to include a power source within the card.

The above data communication system using a conventional IC card 20, however, exhibits the following problem.

In the data communication system using the conventional IC card 20, original data are used as communication data between reader/writer 2 and IC card 20 to keep the manufacturing cost of the system low. Therefore, it is relatively easy for a third party to read the data being communicated. Inevitably, such a system is regarded unsuitable for communicating data requiring secret protection.

To transmit such data requiring secrecy, there is a data communication system in which data are encrypted with a complicated technique before being communicated. For such an encryption, however, a complex, large-scale apparatus is required. This increases the manufacturing cost of the system.

DISCLOSURE OF THE INVENTION

An object of the present invention is to provide a data communication apparatus, a data communication system, and a data communication method, that achieve high level of safety on security at low cost.

The data communication apparatus, system and method according to the present invention are configured to select one of a plurality of conversion methods for conversion between original data and processed data and designate it as a conversion method to be executed, in accordance with a prescribed condition that may be altered and can be commonly recognized with another data communication apparatus.

In summary, the present invention is directed to a data communication apparatus that is provided with a data communication unit, a conversion method designating unit, and a data converting unit.

The data communication unit performs communication of processed data with another data communication apparatus.

The conversion method designating unit selects one of a plurality of conversion methods for conversion between original data and processed data and designates it as a conversion method to be executed, corresponding to a prescribed condition that may be altered and can be commonly recognized with another data communication apparatus.

The data converting unit converts processed data obtained from the data communication unit to original data, or converts original data to processed data to apply to the data communication unit.

The data communication apparatus performs conversion between original data and processed data according to the same conversion method as used in the other data communication apparatus.

According to another aspect of the present invention, a data communication system is provided which performs communication of processed data between one and another data communication apparatuses. This data communication system is configured such that the conversion methods designated for both the data communication apparatuses are the same.

The data communication apparatus is provided with: a first data communication unit that performs communication of processed data with the other data communication apparatus; a first conversion method designating unit that selects one of a plurality of conversion methods for conversion between original data and processed data and designates it as a conversion method to be executed, corresponding to a prescribed condition that may be altered and can be commonly recognized with the other data communication apparatus; and a first data converting unit that converts processed data obtained from the data communication unit to original data, or converts original data to processed data to apply to the first data communication unit, according to the conversion method designated by the first conversion method designating unit.

The other data communication apparatus is provided with: a second data communication unit that performs communication of processed data with the data communication apparatus; a second conversion method designating unit that selects, according to a prescribed condition, one of a plurality of conversion methods for conversion between original data and processed data and designates it as a conversion method to be executed; and a second data converting unit that converts processed data obtained from the second data communication unit to original data, or converts original data to processed data to apply to the second data communication unit, according to the conversion method designated by the second conversion method designating unit.

According to a further aspect of the present invention, a data communication method for performing communication of processed data between at least two data communication apparatuses is provided. The method includes: the step of selecting one of a plurality of conversion methods for conversion between original data and processed data and designating the same as a conversion method to be executed, according to a prescribed condition that may be altered and can be commonly recognized with other data communication apparatuses; and the step of converting processed data received from the other data communication apparatus to original data, or converting original data to processed data to apply to the other data communication apparatus. Here, the conversion methods designated at respective data communication apparatuses are to be made the same.

Accordingly, a main advantage of the present invention is that a conversion method to be executed can be altered as a prescribed condition changes, thereby making it difficult to determine which conversion method is currently utilized for data conversion. As a result, it is possible to improve the level of safety on security on data during data communication. In addition, the present invention is configured such that a conversion method to be executed is selected from a plurality of conversion methods according to the variable condition described above. Thus, even when each conversion method being prepared is relatively simple, the high level of safety on security can be maintained during data communication. Accordingly, it is unnecessary to provide complex large-scale equipment as in the case where data are to be encrypted using a complicated technique. The manufacturing cost of the apparatus and system thus can be restricted.

BRIEF DESCRIPTION OF THE DRAWINGS

FIG. 16 is a diagram illustrating the content to be stored in the non-volatile memory 70 during the automatic adjustment process of the resonance frequency.

BEST MODES FOR CARRYING OUT THE INVENTION

First Embodiment

Figure 1:
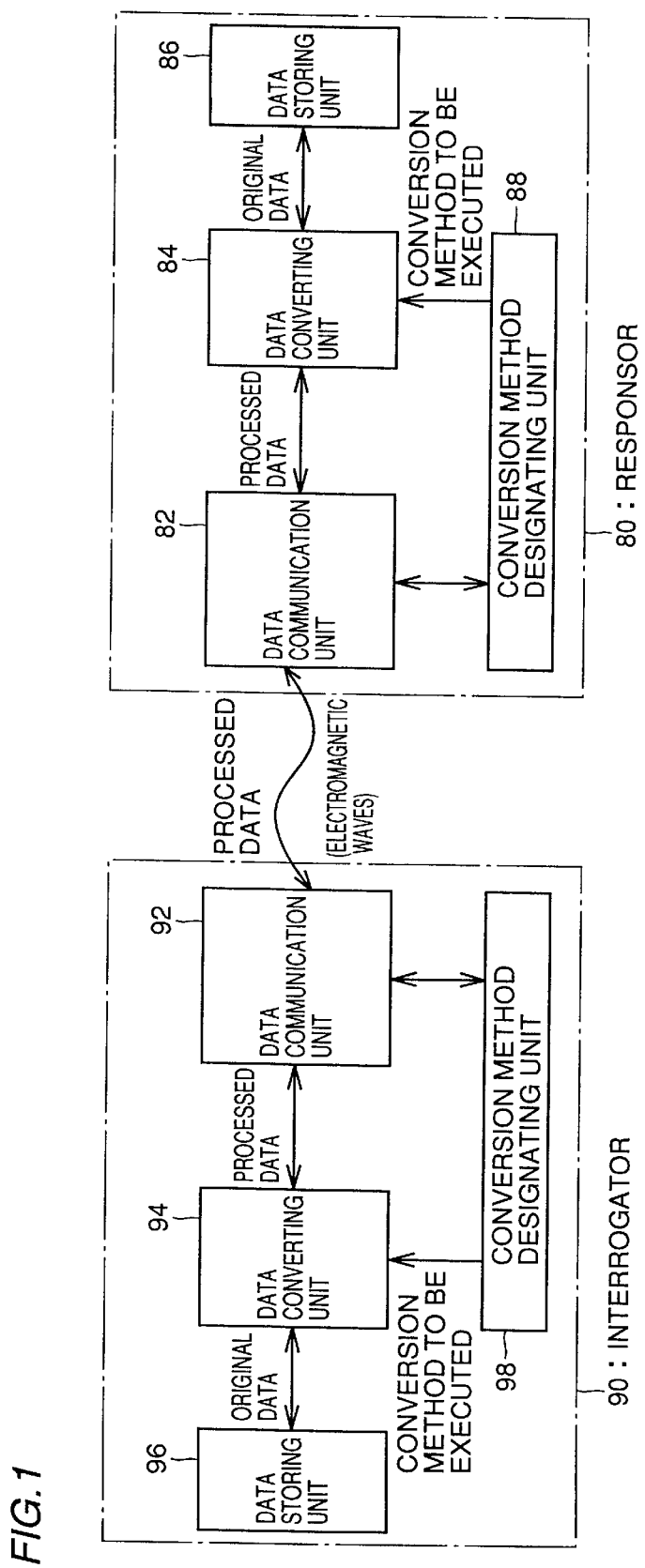
FIG. 1 is a diagram showing a configuration of a data communication system according to an embodiment of the present invention.

FIG. 1 is a diagram showing a configuration of a data communication system according to the first embodiment of the present invention. In this embodiment, a data communication system including a responsor 80 being one data communication apparatus and an interrogator 90 as the other communication apparatus will be described.

This data communication system is a non-contact type data communication system that performs data communication and power transmission between responsor 80 and interrogator 90 in a non-contact manner, by utilizing electromagnetic waves.

Responsor 80 is a data communication apparatus having no power supply source provided therein, which receives the electromagnetic waves output from interrogator 90 and converts them into operational power supply. In responsor 80, data communication unit 82 utilizes the electromagnetic waves to perform data communication with interrogator 90 in a non-contact manner, and to receive power from interrogator 90.

A conversion method designating unit 88 selects one of a plurality of conversion methods for conversion between original data and processed data, and designates it as a conversion method to be executed. This selection is made corresponding to a prescribed characteristic of the electromagnetic waves that may be altered and can be commonly recognized by responsor 80 and interrogator 90.

A data converting unit 84 utilizes the conversion method designated by the unit 88 to convert processed data obtained from data communication unit 82 to original data, and to convert original data to processed data to apply to data communication unit 82. A data storing unit 86 stores the original data.

Interrogator 90 has a configuration identical to that of responsor 80, except that it is provided with operating power supply. In interrogator 90, a data communication unit 92 communicates data with responsor 80 in a non-contact manner, and also sends power to responsor 80, both utilizing the electromagnetic waves.

A conversion method designating unit 98 selects one of a plurality of conversion methods for conversion between original and processed data and designates it as a conversion method to be executed, corresponding to a prescribed characteristic of the electromagnetic waves that may be altered and can be commonly recognized by responsor 80 and interrogator 90.

Since the conversion method to be executed is selected and thus designated corresponding to the prescribed characteristic that can be commonly recognized by responsor 80 and interrogator 90, both conversion method designating units 98 and 88 in interrogator 90 and in responsor 80, respectively, designate the same conversion method.

A data converting unit 94 converts, according to the conversion method designated by the unit 98, processed data obtained from data communication unit 92 to original data, and original data to processed data for application to data communication unit 92. Data storing unit 96 stores the original data.

Figure 2:
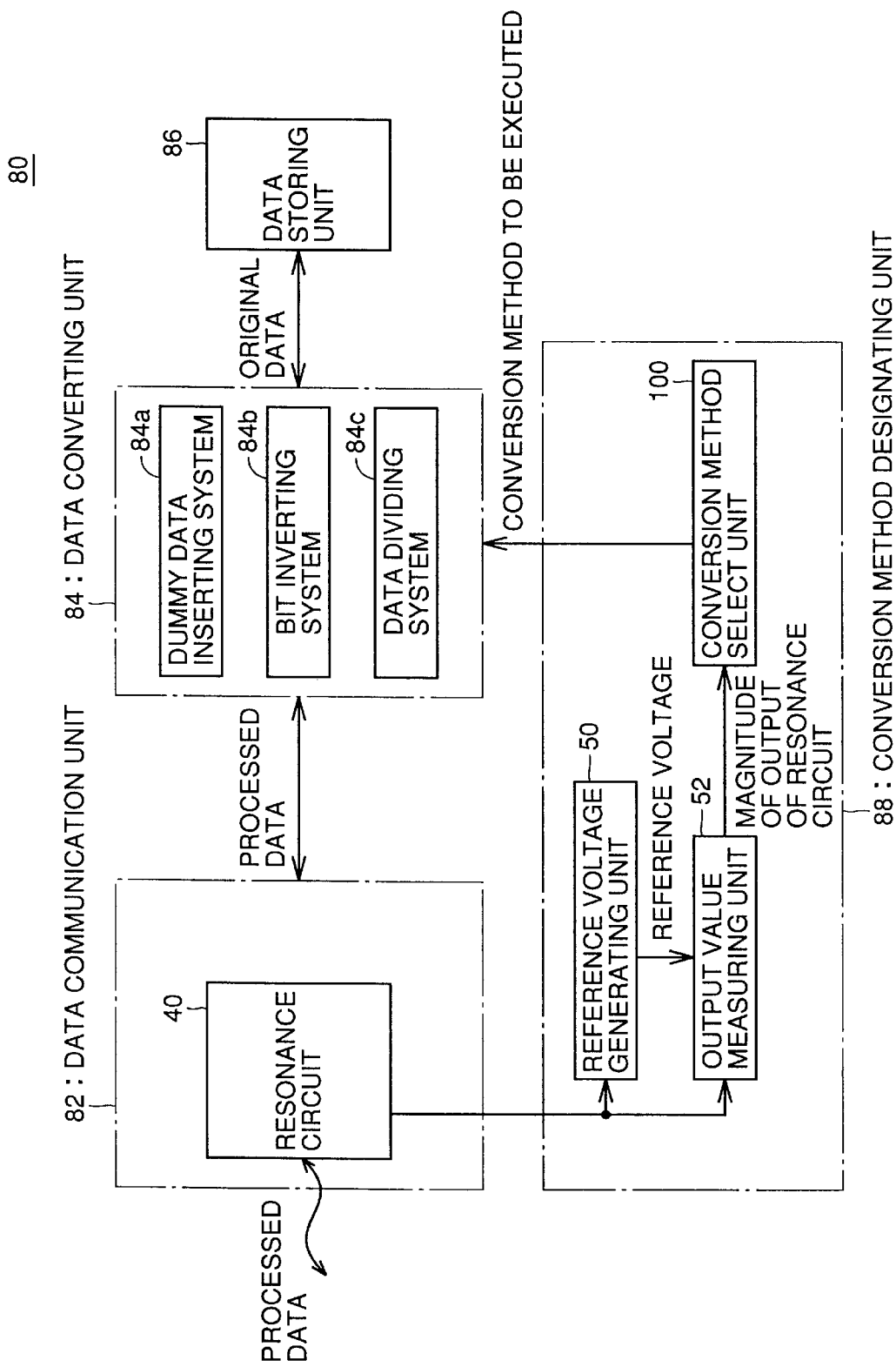
FIG. 2 is a diagram showing an exemplary configuration of a responsor 80.

FIG. 2 shows an example of a detailed configuration of responsor 80. In responsor 80, data communication unit 82 includes a resonance circuit 40 having an antenna that performs data communication and power transmission by utilizing the electromagnetic waves.

Conversion method designating unit 88 includes: a reference voltage generating unit 50 that produces a constant reference voltage regardless of a voltage fluctuation appealing in resonance circuit 40; an output value measuring unit 52 that measures the magnitude of the output of resonance circuit 40 based on the reference voltage produced by reference voltage generating unit 50; and a conversion method select unit 100 that selects a conversion method to be executed according to the magnitude of the output of resonance circuit 40 obtained by output value measuring unit 52.

Data converting unit 84 is provided with three conversion methods for conversion between original and processed data: i.e., a dummy data inserting system 84a, a bit inverting system 84b, and a data dividing system 84c. Data converting unit 84 performs a conversion process according to any conversion method designated by the unit 100, to accomplish conversion between original and processed data.

Figure 3:
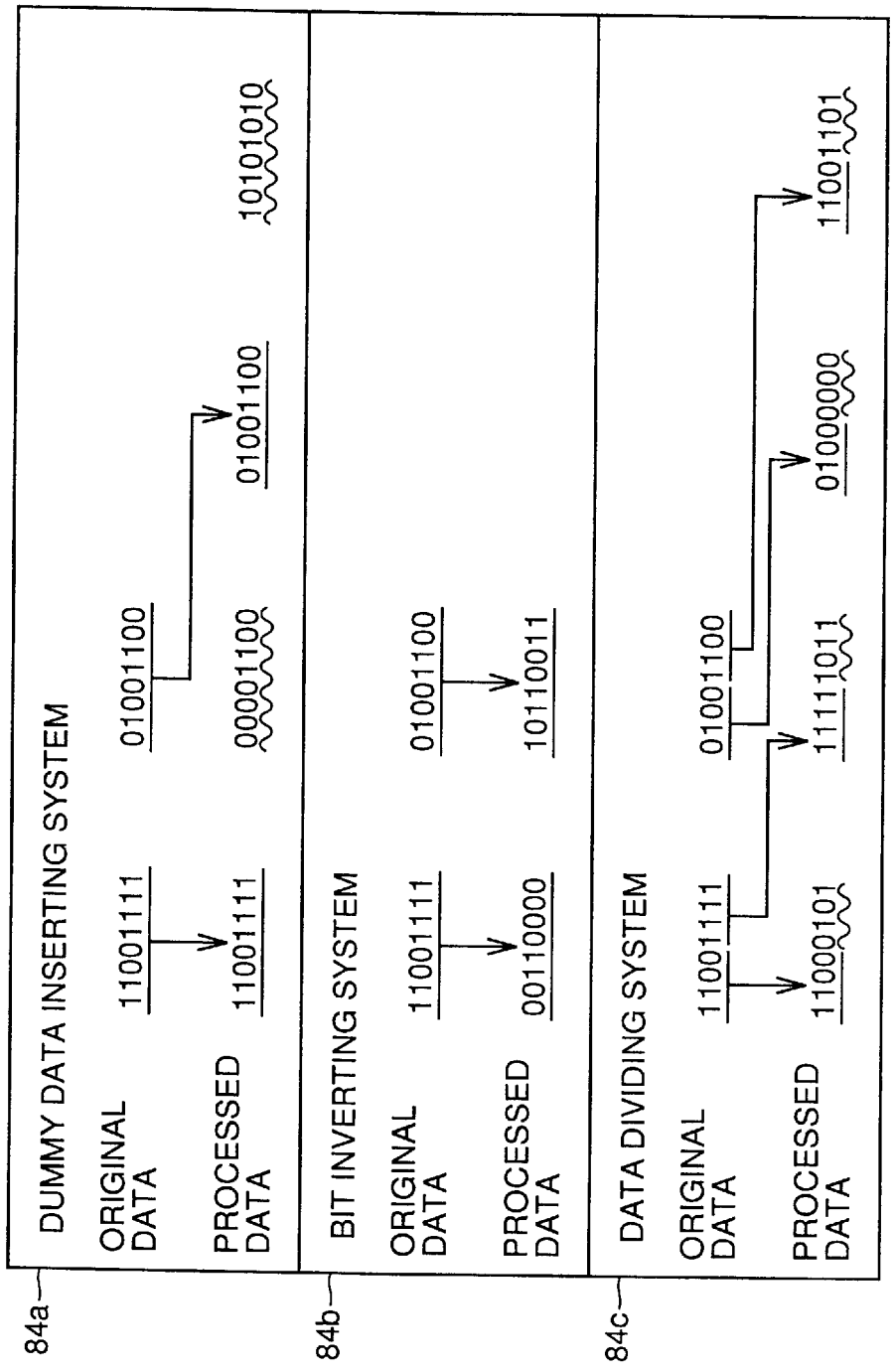
FIG. 3 is a diagram showing an illustrative example of a conversion method between original data and processed data.

FIG. 3 shows examples of respective conversion methods. In dummy data inserting system 84a, dummy data (denoted with wavy lines) are inserted between original data to generate processed data. In bit inverting system 84b, each bit in the original data is inverted to generate processed data. In data dividing system 84c, original data are first divided and dummy bits (underlined with wavy lines) are added to those divided data to generate processed data. Note that these systems are only illustrative, and types and numbers of conversion methods to be prepared are not limited thereto.

Figure 6:
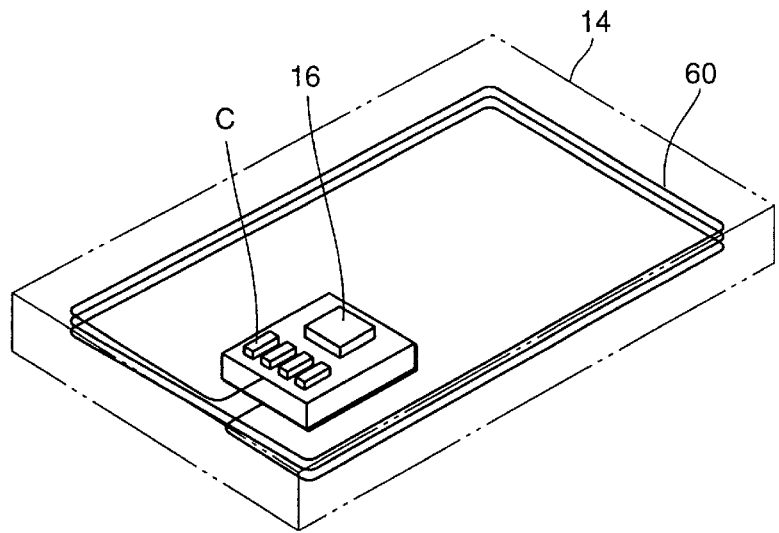
FIG. 6 is a diagram showing an appearance of the IC card.

FIG. 6 illustrates an embodiment of responsor 80 according to the example shown in FIG. 2, which is implemented as a non-contact type IC card. This IC card 14 consists of an antenna 60, a plurality of capacitors C, and an IC chip 16, all accommodated within a card-shaped substrate as shown by a two-dot-one-dash line.

Figure 4:
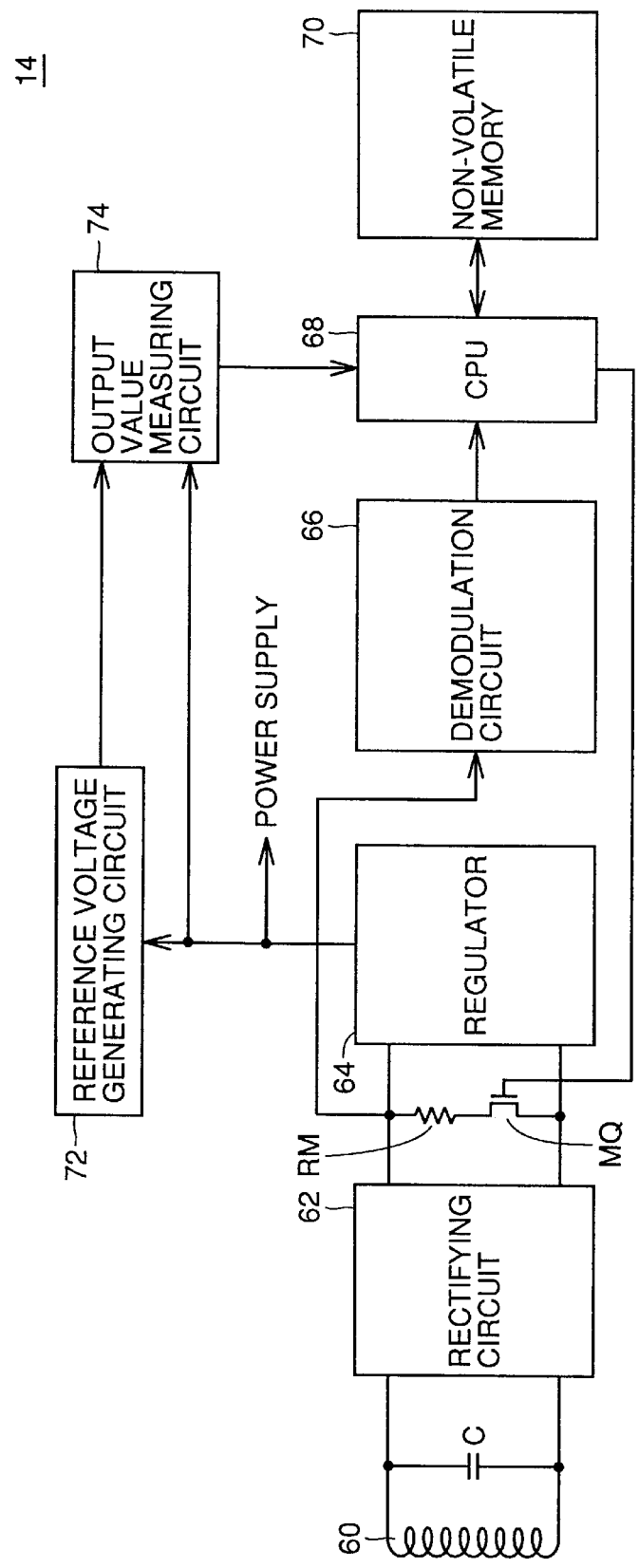
FIG. 4 is a diagram showing a configuration of an IC card according to an embodiment of the present invention.

FIG. 4 is a circuit block diagram of this IC card 14. In the present embodiment, components other than antenna 60 and capacitors C are configured as one IC chip 16. Antenna 60 and capacitors C constitute a resonance circuit of the responsor. A rectifying circuit 62 rectifies the received electromagnetic waves, i.e., high-frequency carrier waves, and sends them to a regulator 64. Regulator 64 stabilizes the received waves, and then sends them as power to each unit.

Figure 5:
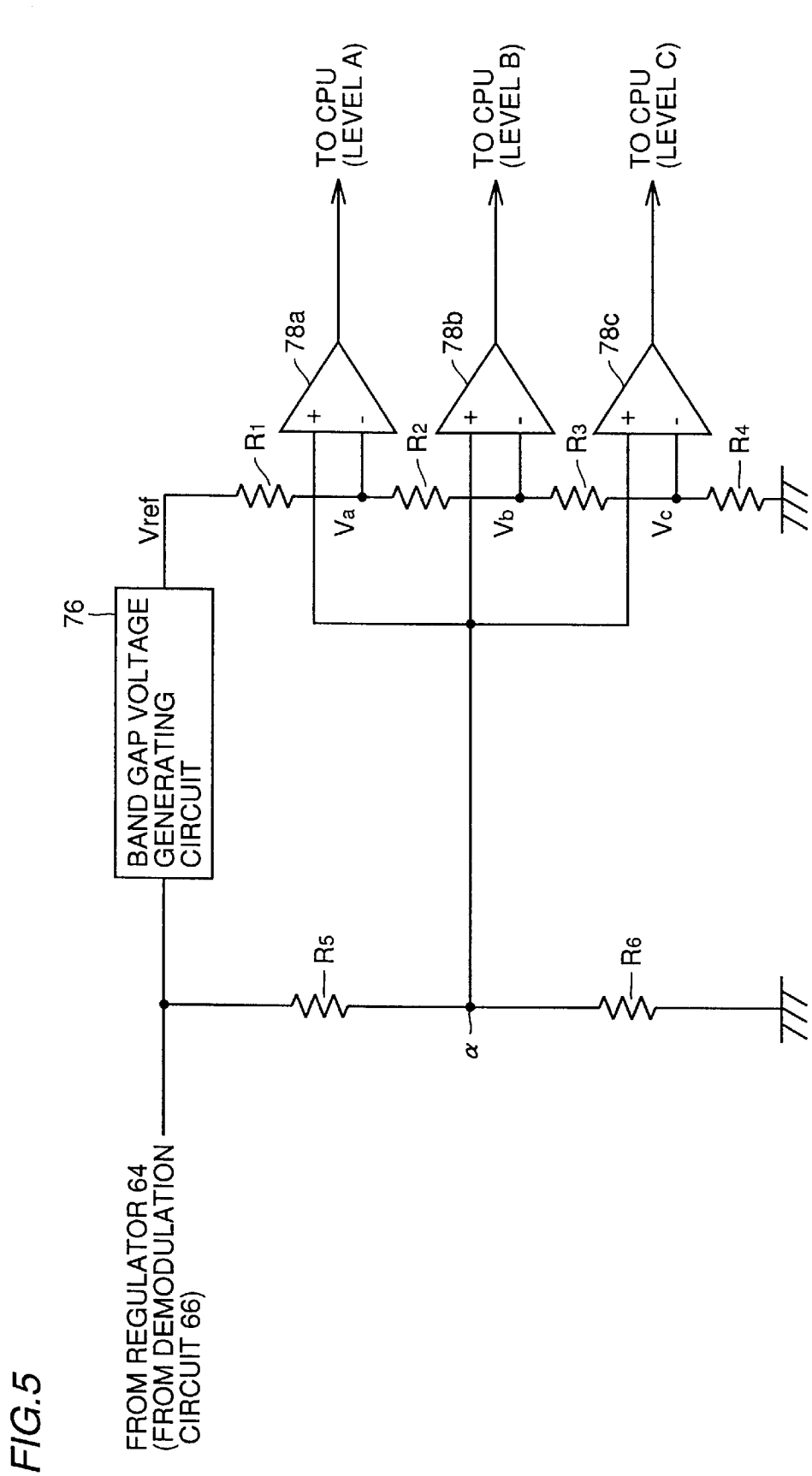
FIG. 5 is a diagram showing details of a reference voltage generating circuit 72 and an output value measuring circuit 74.

The output of regulator 64 is applied to a reference voltage generating circuit 72 and to an output value measuring circuit 74. FIG. 5 shows details of these circuits 72 and 74. Reference voltage generating circuit 72 is configured in this embodiment as a band gap voltage generating circuit 76.

Band gap voltage generating circuit 76 keeps its output voltage constant even when the voltage from regulator 64 fluctuates. This output voltage can thus be used as a reference voltage Vref.

Reference voltage Vref is divided by resistances R1 to R4, to obtain threshold values Va, Vb and Vc. Comparators 78a, 78b and 78c compare these threshold values Va, Vb and Vc with the output from regulator 64 (i.e., a voltage value divided by resistances R5 and R6), respectively, to determine an output level.

Specifically, if the intensity of received carrier waves is great and thus the output from regulator 64 is greater than Va, outputs are obtained from all the comparators 78a (level A), 78b (level B), and 78c (level C). If the output is smaller than Va and greater than Vb, comparators 78b (level B) and 78c (level C) supply outputs. If the output is smaller than Vb and greater than Vc, an output is obtained from comparator 78c (level C) only. If the output is smaller than Vc, none of the comparators supply outputs. The outputs from comparators 78a, 78b and 78c are sent to a CPU 68.

Returning to FIG. 4, CPU 68 selects a conversion method for conversion between original and processed data, based on the output of output value measuring circuit 74.

A demodulation circuit 66 detects modulated high-frequency carrier waves and demodulates them, thereby obtaining processed data sent from a reader/writer 38, which will be described later (see FIG. 7). The processed data are sent to CPU 68, in which they are restored to original data according to the conversion method selected as above, and then a prescribed process is conducted.

Conversely, CPU 68 takes original data out of a non-volatile memory 70 being a data storing unit, and, using the conversion method selected as above, converts the original data to processed data and sends them to reader/writer 38. For this transmission of the processed data to reader/writer 38, CPU 68 only needs to be configured to turn on and off a modulating transistor MQ which then switches on and off the connection of a resistance RM in accordance with the processed data, during the time when reader/writer 38 is outputting high-frequency carrier waves. Consequently, the impedance observed at the reader/writer 38 side can be changed, which enables the amplitude of the carrier waves to be altered. By detecting such modulation in the carrier waves, reader/writer 38 can recognize the process data sent from IC card 14.

Antenna 60, capacitors C, rectifying circuit 62, regulator 64, demodulation circuit 66, modulating transistor MQ, resistance RM, and CPU 68 constitute a data communication unit of the interrogator. The operating program of CPU 68 is stored in non-volatile memory 70.

Figure 7:
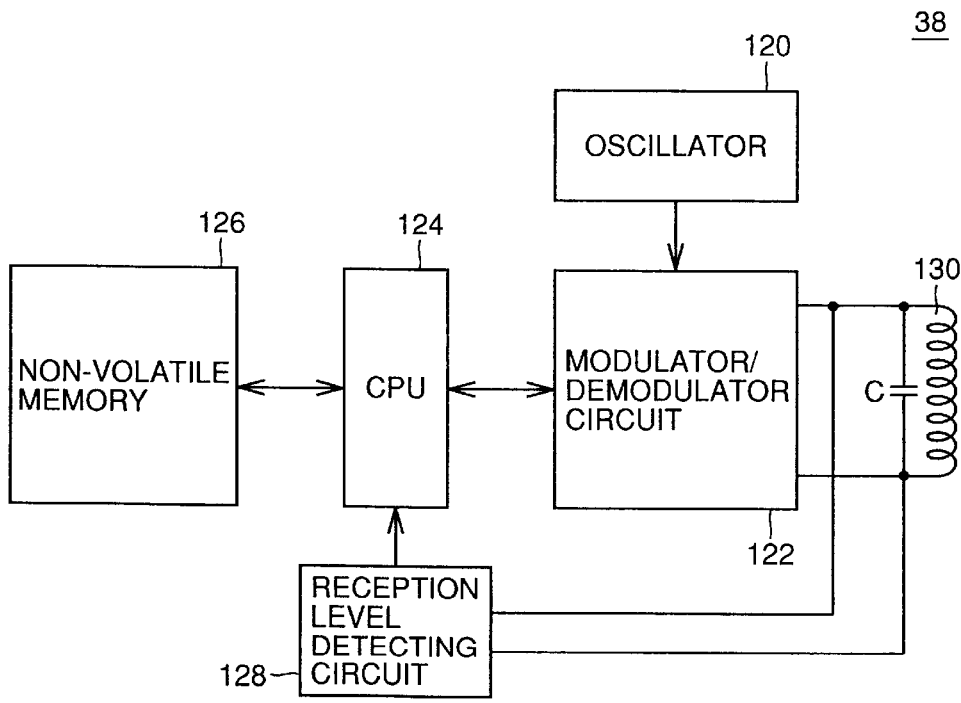
FIG. 7 is a diagram showing an example of a circuit block, when an interrogator 90 as in FIG. 1 is implemented as a non-contact type reader/writer 38.

FIG. 7 is an example of a circuit block diagram that represents interrogator 90 according to the example shown in FIG. 1. In this case, interrogator 90 is implemented as a non-contact type reader/writer 38. This reader/writer 38 is used in conjunction with the IC card 14 described above (see FIG. 4), to realize a non-contact type IC card communication system.

Reader/writer 38 modulates unmodulated, high-frequency carrier waves obtained from oscillator 120 using a modulator/demodulator circuit 122 under the control of a CPU 124, as necessary, and transmits them from an antenna 130. Antenna 130 and a capacitor 3C constitute a resonance circuit of the interrogator. As described above, the signal from IC card 14 is received as a variation in amplitude of carrier waves transmitted, which is caused by the change of impedance (i.e., reflecting impedance) monitored at reader/writer 38 side. Such a signal from IC card 14 is demodulated by modulator/demodulator circuit 122, and then sent to CPU 124.

The level of the signal (received signal) transmitted from IC card 14 is then detected by a reception level detecting circuit 128 and given to CPU 124. In this embodiment, the reception level is measured based on the level of unmodulated, high-frequency carrier waves being sent to IC card 14.

CPU 124 selects a conversion method for conversion between original and processed data in accordance with the output of reception level detecting circuit 128.

CPU 124 converts original data taken out from non-volatile memory 126 to processed data according to the conversion method selected as above, and sends them to modulator/demodulator circuit 122. Modulator/demodulator circuit 122 modulates unmodulated, high-frequency carrier waves based on the converted, processed data, and sends the resulting waves via antenna 130 to IC card 14.

On the other hand, as described above, the processed data from IC card 14 are demodulated by modulator/demodulator circuit 122 and sent to CPU 124. The processed data thus obtained are restored to original data according to the conversion method selected as above, and then a prescribed process is performed.

Antenna 130, capacitors C, oscillator 120, modulator/demodulator circuit 122, and CPU 124 as a whole correspond to the data communication unit of the interrogator. The operating program of CPU 124 is stored in non-volatile memory 126.

Figure 8:
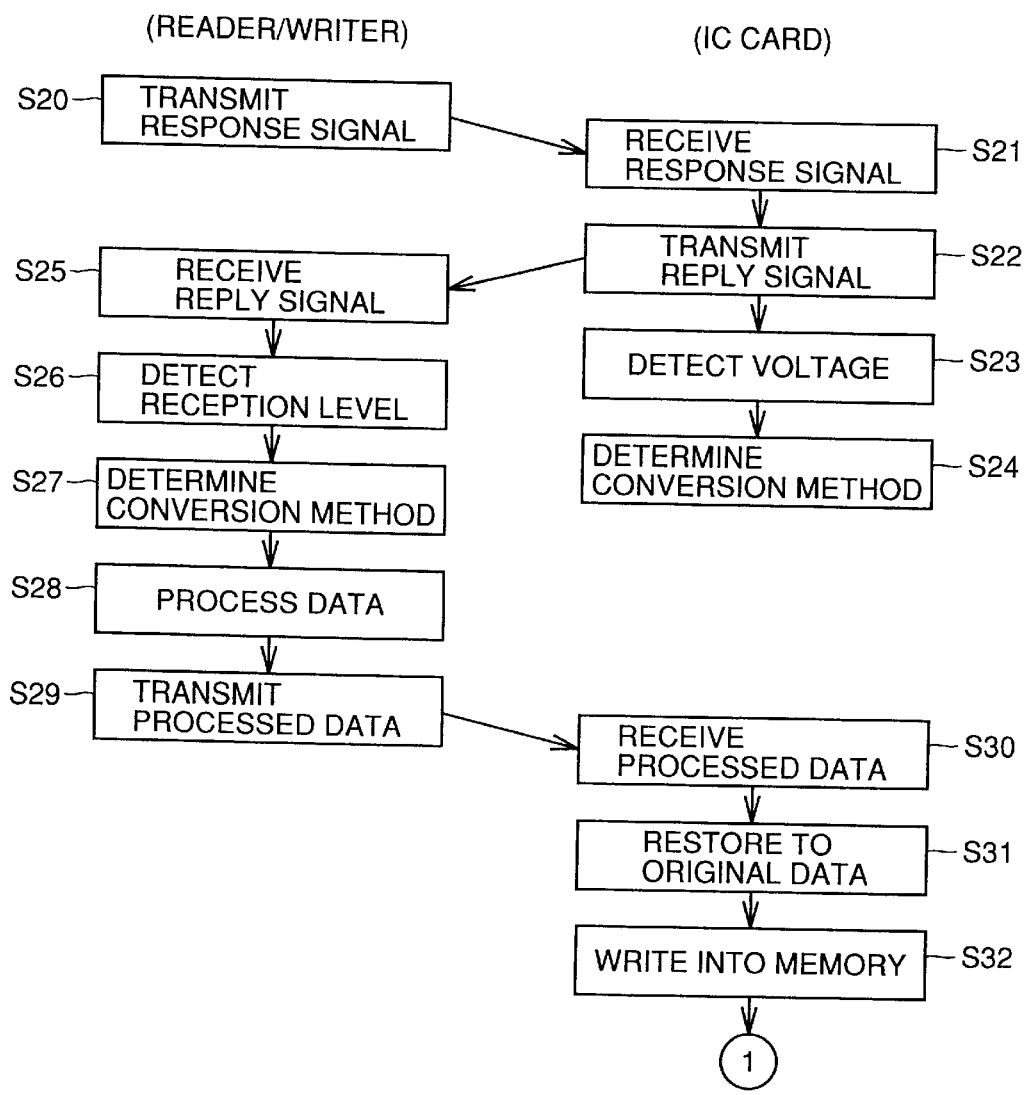
FIG. 8 is a flow chart illustrating an operation of the IC card system comprising an IC card 14 and reader/writer 38.

The operation of the IC card system comprising IC card 14 (see FIG. 4) and reader/writer 38 (see FIG. 7) as explained above will now be described with reference to flow charts shown in FIGS. 8 and 9. Reader/writer 38 sends out a response signal, or high-frequency carrier waves modulated to a prescribed pattern (step S20).

When IC card 14 comes close to reader/writer 38, IC card 14 receives the response signal (step S21). This reception of the response signal activates IC card 14.

Specifically, the response signal being high-frequency carrier waves is received by antenna 60 of IC card 14, which is taken out via control circuit 62 and regulator 64 for use as power for IC card 14.

Furthermore, the response signal is demodulated at demodulation circuit 66 and then taken into CPU 68. If CPU 68 determines the signal taken in is a response signal, CPU 68 returns a reply signal for the response signal to reader/writer 38 (step S22).

The transmission of the reply signal is performed by modulating the unmodulated, high-frequency carrier waves sent from reader/writer 38 at a prescribed pattern. For this modulation of the high-frequency carrier waves, modulating transistor MQ is turned on/off to switch on/off the connection of resistance RM, so that the impedance of the resonance circuit of IC card 14 is altered.

CPU 68 detects reception output of the response signal obtained from regulator 64 as a voltage, via reference voltage generating circuit 72 and output value measuring circuit 74 (step S23). It determines, based on the voltage detected, a conversion method to be used for conversion between original data and processed data (step S24).

Figure 9:
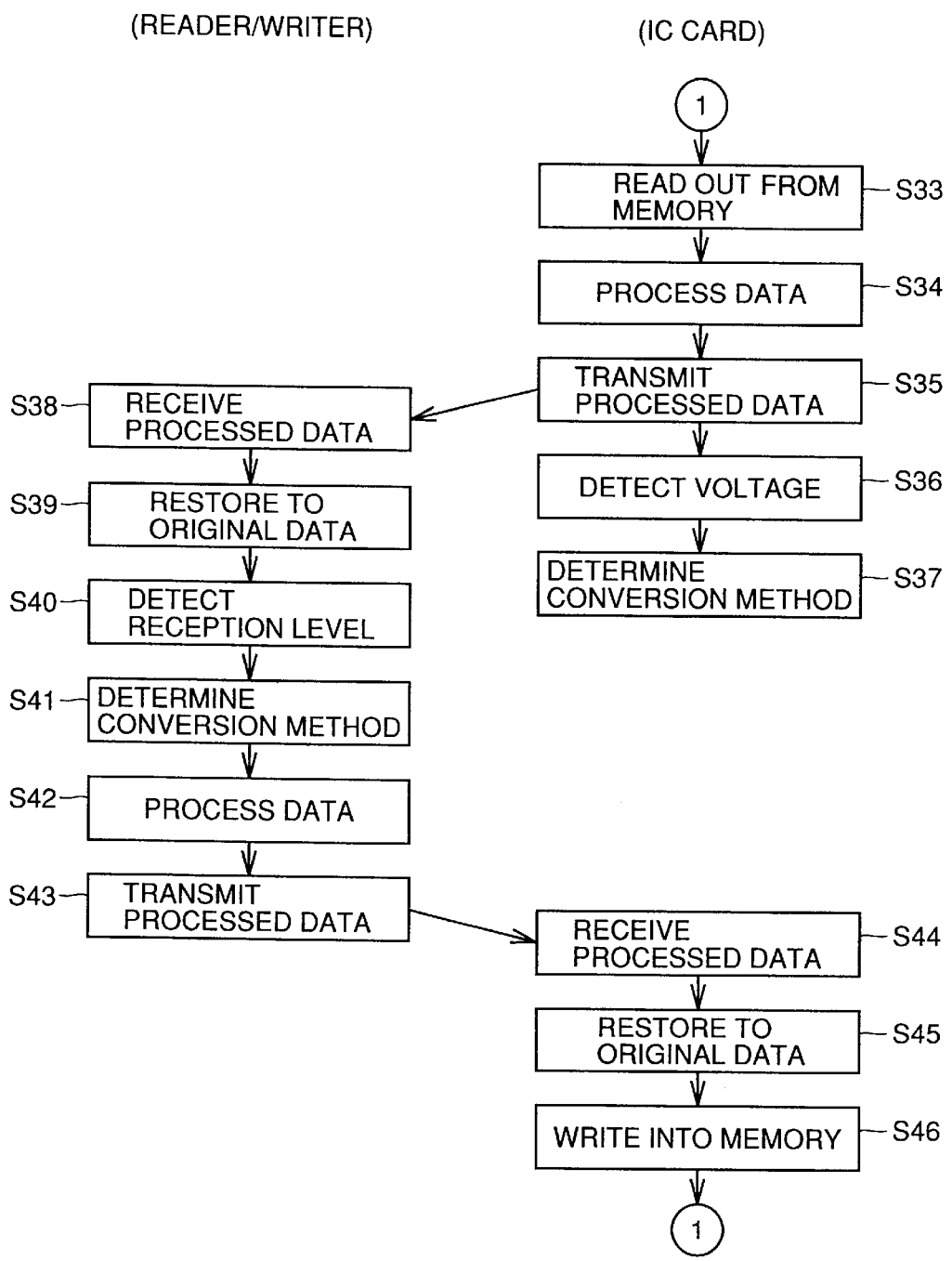
FIG. 9 is a flow chart illustrating an operation of the IC card system comprising an IC card 14 and reader/writer 38.

In this embodiment, three conversion methods are prepared as shown in FIG. 9; i.e., dummy data inserting system 84a, bit determining system 84b, and data dividing system 84c.

The voltage detected is classified into three classes according to the voltage value, each class corresponding to one of the three conversion methods described above. Specifically, CPU 68 determines which class the detected voltage belongs to, and selects and designates a conversion method corresponding to the relevant class as a conversion method to be executed. The processes being performed by the conversion method selecting unit of the responsor correspond to step S24. The processes performed by the conversion method designating unit of the responsor correspond to steps S23 and S24.

The reply signal transmitted in step S22 is received by reader/writer 38 (step S25), demodulated by modulator/demodulator circuit 122, and then sent to CPU 124. When determining that the signal received is a reply signal, CPU 124 performs detection of the reception level via reception level detecting circuit 128 (step S26).

CPU 24 then determines a conversion method to be used for conversion between original and processed data based on the reception level detected (step S27). Prepared as the conversion methods are: dummy data inserting system 84a, bit inverting system 84b, and data dividing system 84c; the same systems as in IC card 14.

The reception level detected is classified into three classes, as in the case of IC card 14, each of which corresponds to one of the three conversion methods. Here, various constants are set such that the reception level detected via reception level detecting circuit 128 of reader/wliter 38 and the voltage detected via output value measuring circuit 74 of IC card 14 as described above belong to the same class. By setting the constants in this manner, the conversion methods designated at respective data communication apparatuses, i.e., reader/writer 38 and IC card 14, can be made the same. The processes performed by the conversion method designating unit of the interrogator correspond to steps S26 and S27.

CPU 124 then takes original data out of non-volatile memory 126, and converts them into processed data according to the conversion method determined by the previous step S27 (step S28). CPU 124 also modulates thus converted, processed data by modulator/demodulator circuit 122, and transmits them to IC card 14 (step S29).

IC card 14 receives the transmitted, processed data (step S30). The received, processed data are demodulated at demodulation circuit 66 before being given to CPU 68. CPU 68 restores the received, processed data to original data according to the conversion method determined in step S24 (step S31), and writes the restored data into non-volatile memory 70 (step S32).

CPU 68 of IC card 14 performs a prescribed process according to the restored original data. It then reads out of non-volatile memory 70 the original data to be transmitted, and converts them to processed data according to the above-described conversion method (step S34).

The processes performed by the data converting unit of the responsor correspond to step S31 as described above or step S34.

CPU 68 transmits the obtained, processed data to reader/writer 38 in the same manner as in step S22 for the reply signal (step S35). At this time, CPU 68 detects the reception output of the high-frequency carrier waves transmitted from reader/writer 38 in the same manner as in step S23 (step S36), and based on the voltage detected, determines a new conversion method for conversion between original and processed data (step S37).

Reader/writer 38 receives the processed data transmitted from IC card 14 (step S38). CPU 124 takes in the received, processed data via modulator/demodulator circuit 122, and according to the conversion method determined previously (in step S27), restores the processed data to original data (step S39). CPU 124 then performs a prescribed process according to the restored, original data. The processes performed by the data converting unit in the interrogator correspond to step S28 described above or step S39.

CPU 124 then detects the reception level at the time of reception of the processed data (step S38) in the same manner as in step S26 (step S40), and based on the detected reception level, determines a new conversion method to be used for conversion between original and processed data (step S41). The conversion method determined in this step and the conversion method newly determined at IC card 14 (in step S37) are made to be the same conversion method.

CPU 124 of reader/writer 38 reads out from non-volatile memory 126 original data to be transmitted, and converts them to processed data according to the conversion method newly determined in the previous step S41 (step S42). It then modulates the converted, processed data via modulator/demodulator circuit 122, and sends them to IC card 14 (step S43).

CPU 68 of IC card 14 receives the processed data transmitted (step S44), restores the received, processed data to the original data according to the new conversion method determined in step S37 (step S45), and writes the restored, original data into non-volatile memory 70 (step S46).

Thereafter, returning to step S33, IC card 14 and reader/writer 38 repeat the same processes. Thus, by implementing the configuration in which a new conversion method is designated for every set of data sent and received, it is possible to improve the safety on security of data.

Though the present embodiment has been configured to update a conversion method for every return of data, another configuration is possible in which a conversion method is to be updated for every few returns of data. Alternatively, it is also possible to maintain a designated conversion method once it is fixed, until a single period of contact for communication is completed.

Second Embodiment

In the first embodiment, a data communication system was described in which both power transmission and data communication were performed utilizing the same carrier waves. The present invention can also be applied to a data communication system in which power supply and data communication are to be performed separately utilizing different carrier waves with different frequencies.

Figure 10:
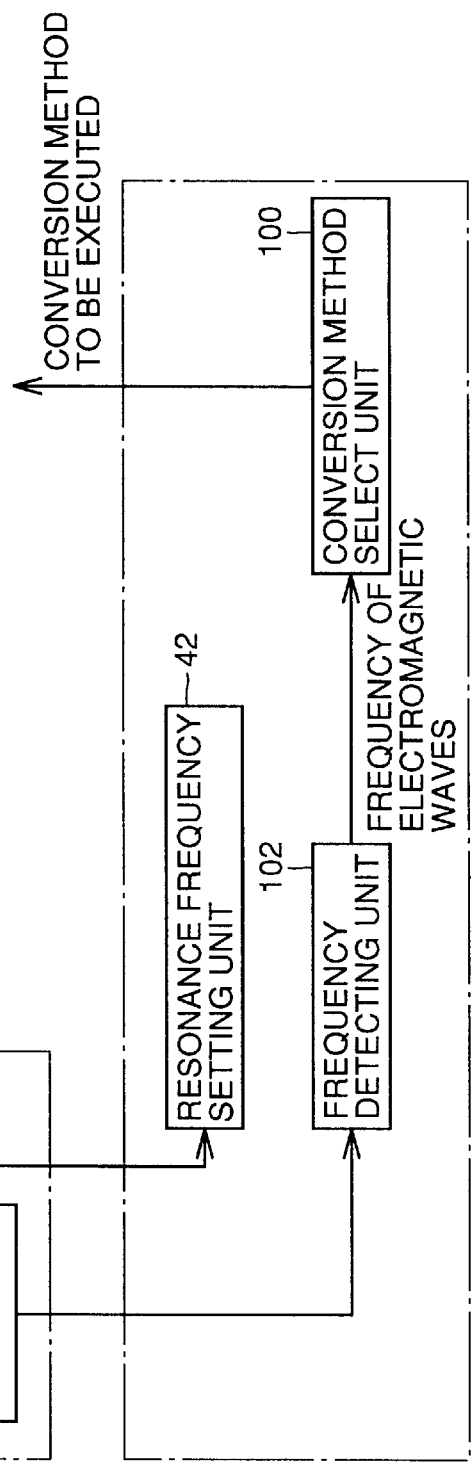
FIG. 10 is a diagram showing another exemplary configuration of responsor 80 shown in FIG. 1.

FIG. 10 illustrates a configuration of responsor 80 as shown in FIG. 1, in the case where it is to be applied to such an embodiment. In this responsor 80, data communication unit 82 comprises resonance circuit 40, which includes an antenna for performing data communication utilizing electromagnetic waves, and the resonance frequencies of which can be switched by a switching unit.

While resonance frequencies of resonance circuit 40 are being switched using the switching unit, a resonance frequency setting unit 42 receives output signals from resonance circuit 40 at respective switched states, and sets the switched state of the switching unit so that a desirable output signal can be obtained.

A frequency detecting unit 102 detects the frequency of electromagnetic waves that are obtained via resonance circuit 40 having a favorable resonance frequency set by resonance frequency setting unit 42. A conversion method select unit 100 selects a conversion method to be executed in accordance with the frequency of electromagnetic waves detected by frequency detecting unit 102. It should be understood that data converting unit 84 and data storing unit 86 in this embodiment are identical to those in the example shown in FIG. 2, and thus, description thereof will not be repeated.

Figure 11:
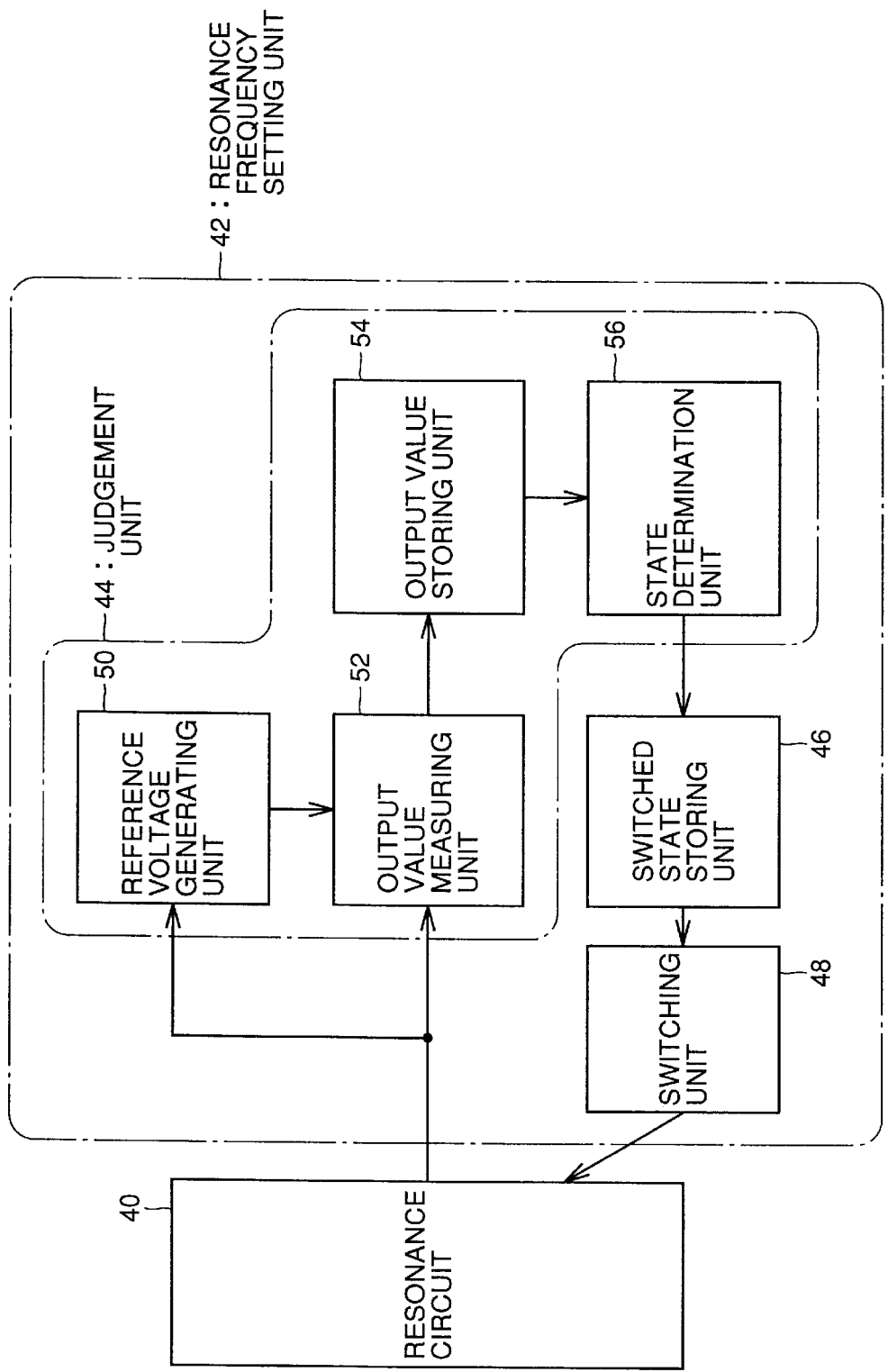
FIG. 11 is a diagram showing a configuration of a resonance frequency setting circuit 42.

FIG. 11 shows a detailed configuration of the resonance frequency setting unit 42 described above. A switching unit 48 sequentially switches the resonance frequencies of resonance circuit 40. A reference voltage generating unit 50 receives the output from resonance circuit 40, and converts it into a direct-current voltage. The magnitude of direct-current voltage to be converted may change as the resonance frequencies are switched. However, reference voltage generating unit 50 can obtain a constant reference voltage regardless of such voltage fluctuation.

Based on this reference voltage, an output value measuring unit 52 measures the output value of resonance circuit 40 for every resonance frequency. The measured output values are stored in an output value storing unit 54, each related to a corresponding resonance frequency (i.e., corresponding switched state).

A state determination unit 56 selects the largest output value among those stored in output value storing unit 54, and determines corresponding switched state as a switched state that is most preferred (a favorable switched state). The state that offers a resonance frequency enabling the most efficient data communication can thus be obtained as the favorable switched state. This favorable switched state is stored in a switched state storing unit 46.

Once the adjustment of resonance frequency is completed as described above, switching unit 48 can determine the resonance frequency of resonance circuit 40 according to the favorable switched state stored in switched state storing unit 46.

Figure 12:
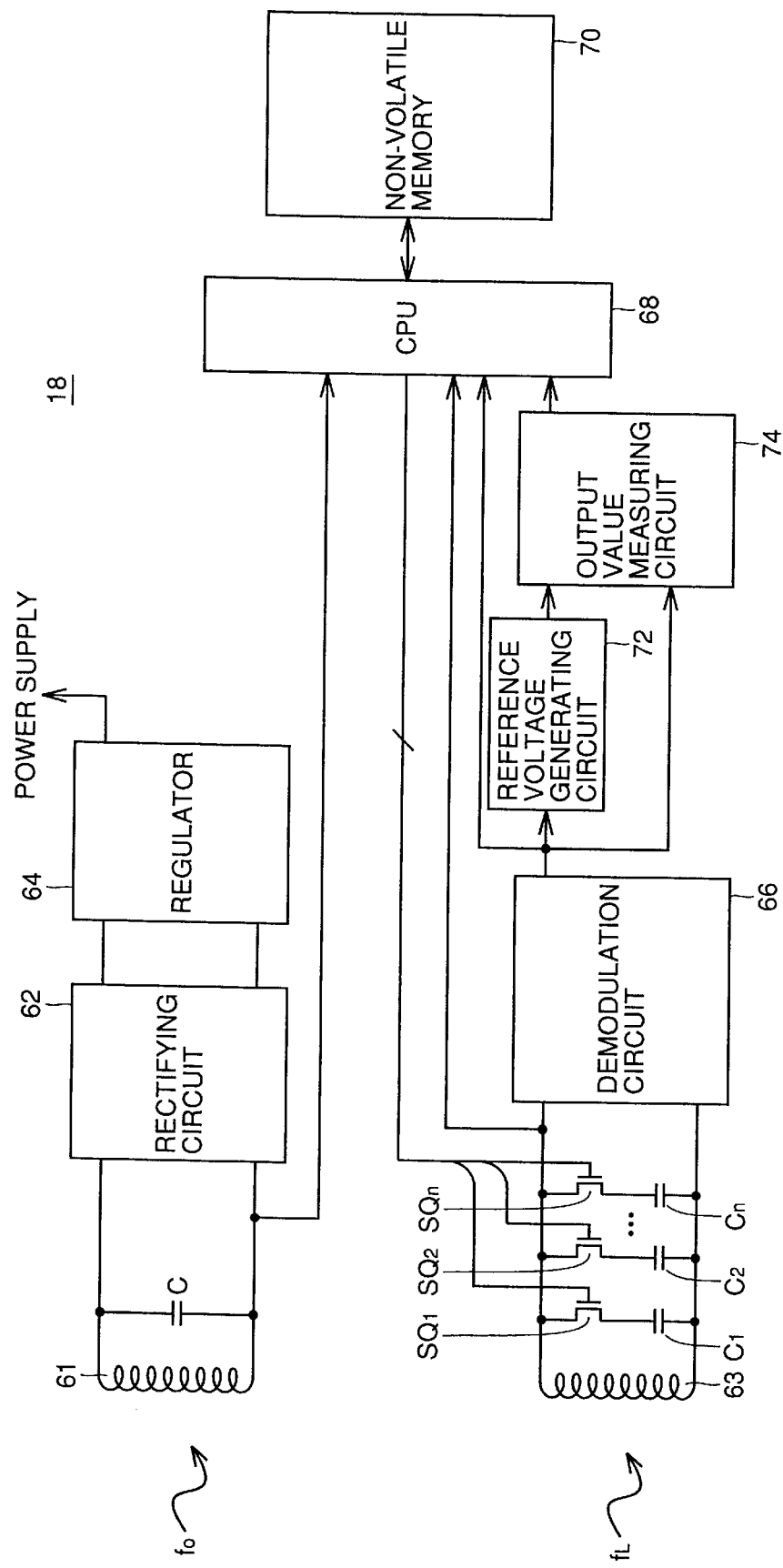
FIG. 12 is a diagram showing a configuration of the IC card according to a second embodiment of the present invention.

FIG. 12 is a circuit block diagram of responsor 80 in the example shown in FIG. 10, which, in this case, is implemented as a non-contact type IC card 18. This card receives power from reader/writer 58, which will be described later (see FIG. 20), via unmodulated, high-frequency carrier waves $f_0$ with a fixed frequency, whereas it communicates processed data with reader/writer 58 via high-frequency carrier waves $f_L$. The carrier waves $f_L$ are modulated at the time of communication of processed data, in accordance with the processed data. Their frequencies are altered according to the conversion methods to be used for conversion between original and processed data.

The resonance circuit for receiving power supply is formed of an antenna 61 and a capacitor C. Rectifying circuit 62 rectifies the received carrier waves $f_0$ to apply to regulator 64. Regulator 64 stabilizes them, and supplies them as power to each unit. The frequency of the received carrier waves $f_0$ is given from the resonance circuit to CPU 68.

The resonance circuit for data communication is formed of an antenna 63, capacitors C1–Cn, and transistors SQ1–SQn constituting a switching unit. Demodulation circuit 66 detects the modulated carrier waves $f_L$ and demodulates the same. The output of demodulation circuit 66 is sent to reference voltage generating circuit 72 and output value measuring circuit 74. The output of demodulation circuit 66 is measured by comparing it with the reference voltage.

It should be understood that both reference voltage generating circuit 72 and output value measuring circuit 74 have configurations identical to those (see FIG. 5) in the above embodiment (see FIG. 4).

CPU 68 automatically adjusts the resonance frequency of the resonance circuit for data communication so as to maximize the output of demodulation circuit 6G. This adjustment of the resonance frequency is performed by switching transistors SQ1–SQn appropriately. With such a configuration enabling automatic adjustment of the resonance frequency of the resonance circuit for data communication, it is possible to communicate processed data efficiently corresponding to the fluctuating frequency of carrier waves $f_L$. The detection of the frequency of carrier waves $f_L$ is also simplified.

CPU 68 detects the frequency of carrier waves $f_L$ being used for data communication, with the fixed frequency of carrier waves $f_0$ being used for power supply as a reference. CPU 68 selects a conversion method for conversion between original and processed data based on the detected frequency of carrier waves $f_L$ and, using the system selected, performs the data conversion.

Demodulation circuit 66 demodulates the modulated carrier waves $f_L$ to obtain processed data, and supplies the data to CPU 68. For transmission of the processed data to reader/writer 58, CPU 68 takes control over switching among a favorable switched state and the other switched states dependent on the processed data, while reader/writer 58 is outputting unmodulated carrier waves $f_L$. This causes the impedance observed at reader/writer 58 side to be changed, and thus, the amplitude of carrier waves $f_L$ is altered. Transmission of the processed data to reader/writer 58 is thus accomplished.

Figure 13:
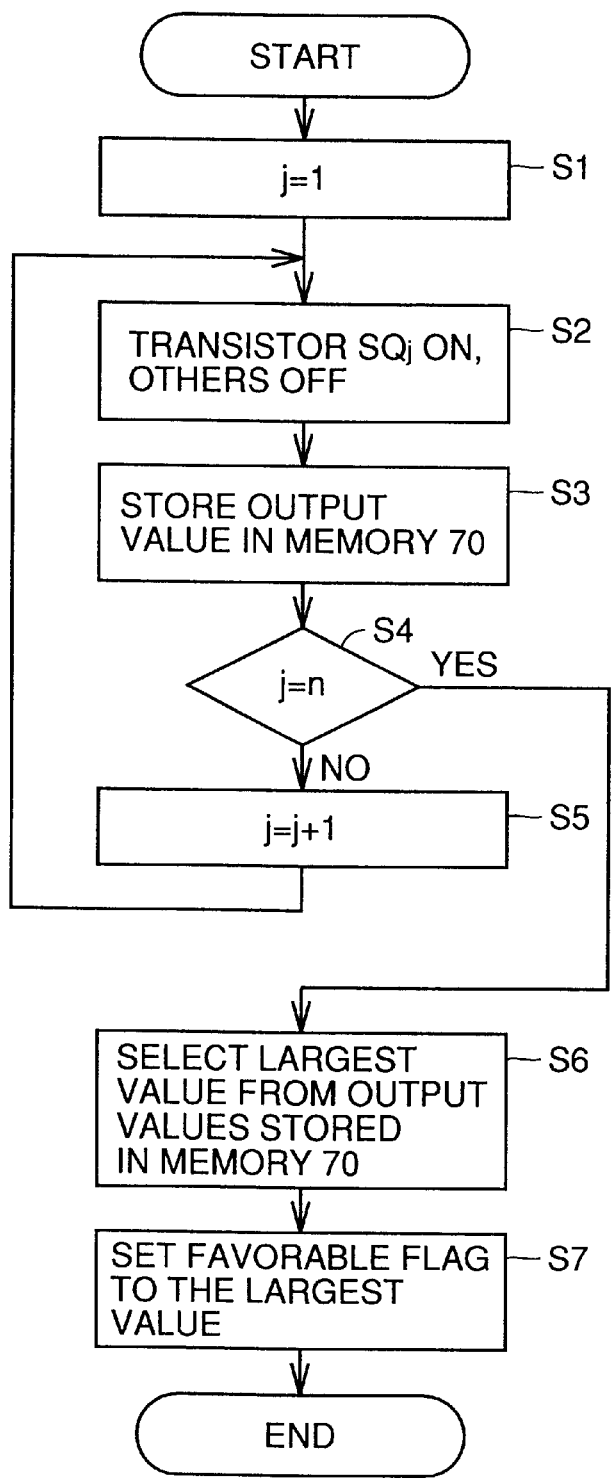
FIG. 13 is a flow chart illustrating an automatic adjustment process of a resonance frequency.

Non-volatile memory 70 stores therein not only programs for communication and conversion between original and processed data, but also a program for automatic adjustment of the resonance frequencies of resonance circuit for data communication. FIG. 13 is a flow chart of this automatic adjustment program. With reference to the flow chart of FIG. 13 and the block diagram of FIG. 12, the process for automatic adjustment of resonance frequencies will now be described.

Entering an automatic adjustment mode (see step S55 in FIG. 21), CPU 68 first sets a variable j, indicating a switched state, to 1 (step S1).

Figure 15:
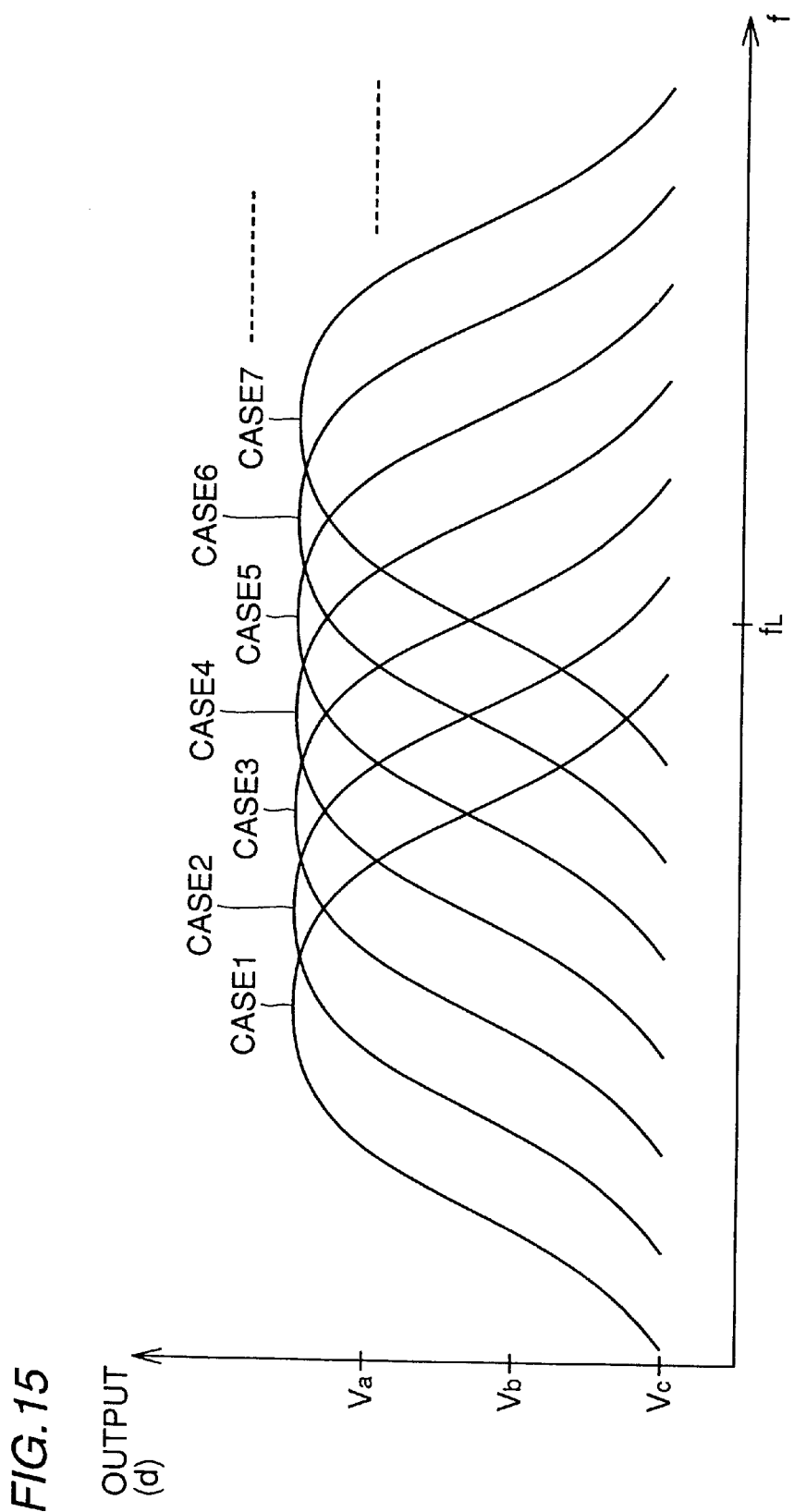
FIG. 15 is a diagram illustrating a relationship between frequency characteristics of a resonance circuit for each switching state, and frequency of carrier wave $f_L$ of reader/writer 38.

Next, CPU 68 turns transistor SQj on, and turns the other transistors off (step S2). Because currently j=1, only transistor SQ1 turns on. Therefore, capacitor C1 is connected, exhibiting the lowest resonance frequency. CASE1 in FIG. 15 illustrates the frequency characteristic of the resonance circuit in this situation.

The vertical axis of this figure shows a voltage on the point α shown in FIG. 5. Here, given that the frequency of carrier waves $f_L$ to be used for data communication with reader/writer 58 is currently at $f_L$, there are no output from comparators 78a, 78b and 78c in CASE1, as seen in FIG. 15.

CPU 68 stores in non-volatile memory 70, the outputs φA, φB, φC of comparators 78a, 78b, 78c, respectively, by associating them with respective switched states j (step S3, see FIG. 16).

Here, φA=0, φB=0, and φC=0 are stored.

It is to be understood that, in this embodiment, the process for storing information in non-volatile memory 70 as shown in FIG. 16 corresponds to the processes performed by the output value storing unit and the switched state storing unit.

Next, in step S4, a determination is made whether switched state j has reached the maximum value n or not. If not, switched state j is incremented to j=2 (step S5).

Returning back to step S2, the same process as above is repeated for the second switched state. Specifically, transistor SQ2 is turned on, with the other transistors being turned off, to connect capacitor C2. The frequency characteristic of the resonance circuit now is shown as CASE2 in FIG. 15, in which case an output is obtained only from comparator 78c for carrier waves $f_L$. Receiving this output, CPU 68 stores in non-volatile memory 70, φA=0, φB=0, and φC=1 corresponding to j=2, as shown in FIG. 16.

The above-described process is repeated until switched state j reaches n, and the process then proceeds to step S6. With the process being completed up to j=n, non-volatile memory 70 now stores the output levels in respective switched states, as shown in FIG. 16. Among these output values stored, the largest one is selected in step S6.

In this case, the largest output value exists corresponding to switched states a=4, 5 and 6. Of these states, the switched state j=5 that is located at the center thereof is selected as the favorable switched state. That the switched state a=5 is preferable is also obvious from FIG. 15.

CPU 68 then sets a favorable flag for this favorable switched state j=5 and stores the information (step S7). Thus, in the second embodiment, the processes to be performed by the state determining unit correspond to step S6.

Figure 14:
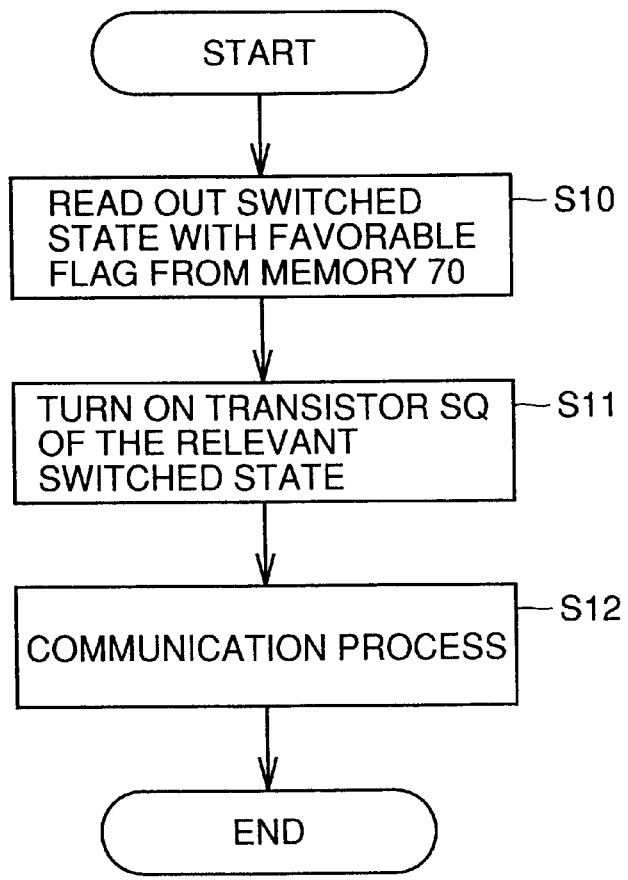
FIG. 14 is a diagram illustrating an operation process by a suitable resonance frequency.

After determination of the favorable switched state as described above, CPU 68 performs operations at the relevant favorable resonance frequency. FIG. 14 is a flow chart for this process.

First, in step S10, CPU 68 obtains from non-volatile memory 70, switched state j stored therein with the favorable flag. Next, it turns on the transistor SQj that is designated by the switched state j (step S11). Thus, it is possible to receive, from reader/writer 58, carrier waves $f_L$ for data communication in the most efficient state.

Thereafter, CPU 68 performs a prescribed communication process (step S12). In this embodiment, the processes performed by the switching unit correspond to steps S10 and S12.

As explained above, it is possible to automatically adjust the resonance frequency of resonance circuit of IC card 18 such that carrier waves $f_L$ for data communication can be received from reader/writer 58 in the most efficient manner.

Thus, even in the case where the frequency of carrier waves $f_L$ for use in data communication varies, the resonance frequency of the resonance circuit can readily be adjusted. In addition, once the adjustment is completed, only the operations shown in FIG. 14 are required to obtain a favorable resonance frequency unless the frequency of carrier waves $f_L$ changes. Thus, the operating speed is prevented from being degraded.

In the embodiment described above, every switched state is thoroughly examined before a favorable switched state is obtained. Alternatively, it is possible to have a configuration in which the examination is stopped once an output exceeding a prescribed threshold value is obtained, and the switched state offering the value exceeding the threshold value is to be set as the favorable switched state. This allows quicker automatic adjustment.

Furthermore, it is also possible to have a configuration in which, after an output exceeding a prescribed threshold value is found and when a succeeding output value no longer exceeds the previous value, the subsequent examinations are cancelled and the switched state corresponding to the largest value at that point is selected as the favorable switched state. This allows an optimal switched state to be obtained quickly.

In the above-described embodiment, any one of the capacitors C1 to Cn is connected to antenna 63. However, it is possible to provide a switched state in which a plurality of capacitors are connected to antenna 63 simultaneously, so that a large number of switched states can be obtained with a small number of capacitors.

Furthermore, in the above embodiment, a number of switched states are prepared such that an optimal switched state can be obtained even when the frequency of carrier waves $f_L$ changes consecutively. However, in the case where the frequency of carrier waves $f_L$ is to be selected from a predetermined plural number of fixed frequencies, only switched states that enable the resonance frequencies to be selected corresponding to the predetermined number of fixed frequencies are needed.

Figure 17A:
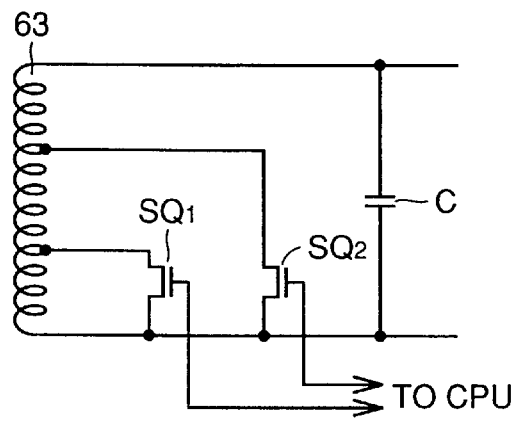
FIGS. 17A, 17B and 17C are diagrams illustrating other examples of the resonance circuit.
Figure 17B:
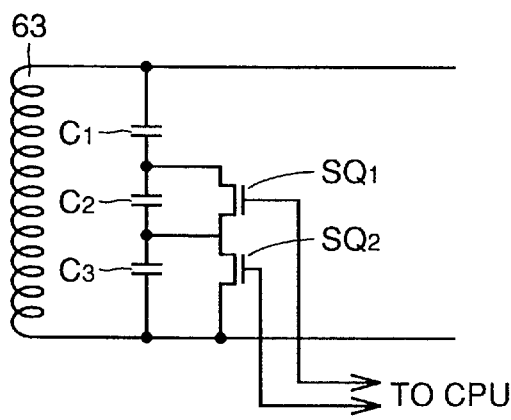
Figure 17C:
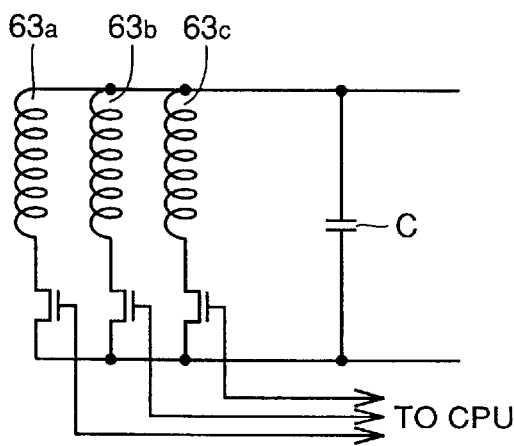

FIGS. 17A, 17B and 17C show other configurations of the resonance circuit. The configuration of FIG. 17A can alter effective inductance of antenna 63. The configuration of FIG. 17B can alter connection states of capacitors C1, C2 and C3 that are connected in series. The configuration of FIG. 17C can alter connection states of antennas 63a, 63b and 63c that are connected in parallel. The resonance circuit may also be configured as a given combination thereof. The configuration of the resonance circuit may be determined by taking into consideration ease in forming respective elements and the number of connect points to be allowed for realization of an IC chip.

Third Embodiment

Figure 18A:
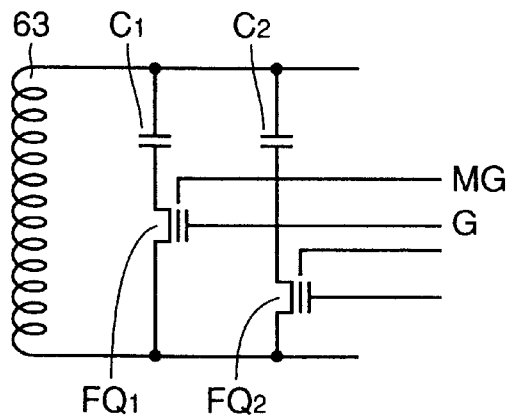
FIGS. 18A and 18B are diagrams illustrating how a transistor being a switching circuit and a storage circuit with a suitable flag can be formed by a single element.
Figure 18B:
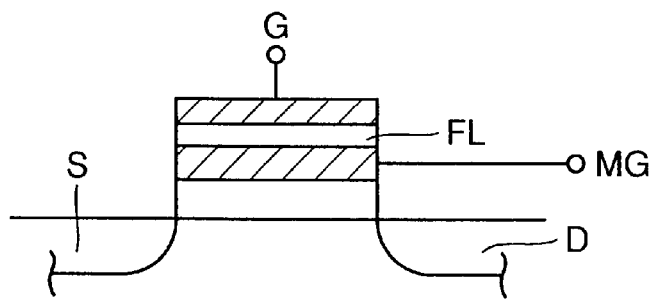

In the second embodiment described above, when IC card 18 is in use, CPU 68 reads out a favorable switched state denoted by the favorable flag from non-volatile memory 70, and based on the state, turns on any one of transistors SQ1 to SQn. However, as shown in the circuit diagram of FIG. 18A, the storage element with the favorable flag and the transistor may be shared by non-volatile memories FQ1, FQ2, . . . , having ferroelectric layers FL therein. In this non-volatile memory FQ, a plarization direction of ferroelectric layer FL can be changed according to the direction of the voltage applied between a gate G and a memory gate MG, as shown in FIG. 18B in cross section.

Corresponding to the polarization direction, a source S and a drain D are turned on and off. According to this embodiment, CPU 68 polarizes in advance, the ferroelectric layer FL of the non-volatile memory that is to be turned on in a switched state to an ON direction. This allows the relevant non-volatile memory to automatically turn on. Thus, in its actual use, CPU 68 can select a capacitor for attaining a desirable resonance frequency without having to perform the processes of steps S10 and S11 shown in FIG. 14. Accordingly, it is possible to improve the operating speed.

Fourth Embodiment

Figure 19:
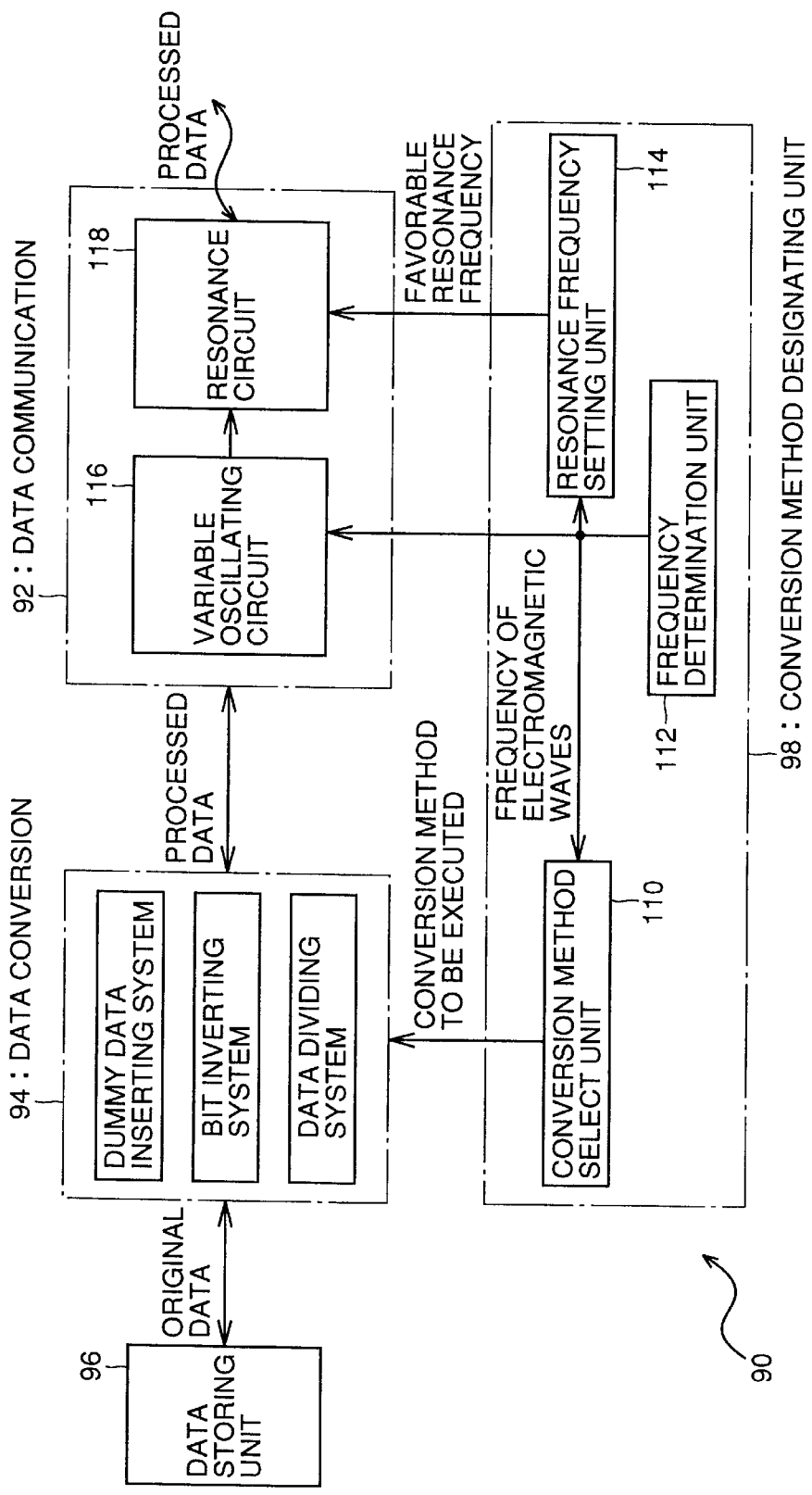
FIG. 19 is a diagram showing an exemplary configuration of interrogator 90 shown in FIG. 1.

FIG. 19 shows another configuration of interrogator 90 shown in FIG. 1. This interrogator 90 constitutes, along with responsor 80 shown in FIG. 10 described above, a data communication system that performs power supply and data communication utilizing different carrier waves having different frequencies.

In interrogator 90 shown in FIG. 19, data communication unit 92 includes: a resonance circuit 118 which has an antenna for performing the data communication utilizing the electromagnetic waves and has a resonance frequency that may be switched by a switching unit; and a variable oscillating circuit 116 which is a circuit oscillating a variable frequency to provide electric oscillation to resonance circuit 118 and which specifically oscillates a frequency determined by a frequency determination unit 112, which will be described later.

A conversion method designating unit 98 includes: a frequency determination unit 112 that determines an oscillation frequency of variable oscillating circuit 116 at random; a conversion method select unit 110 that selects a conversion method to be executed, corresponding to the oscillation frequency determined by frequency determination unit 112; and a resonance frequency setting unit 114 that sets the resonance frequency of resonance circuit 118 to a favorable resonance frequency that corresponds to the oscillation frequency determined by frequency determination unit 112.

Figure 20:
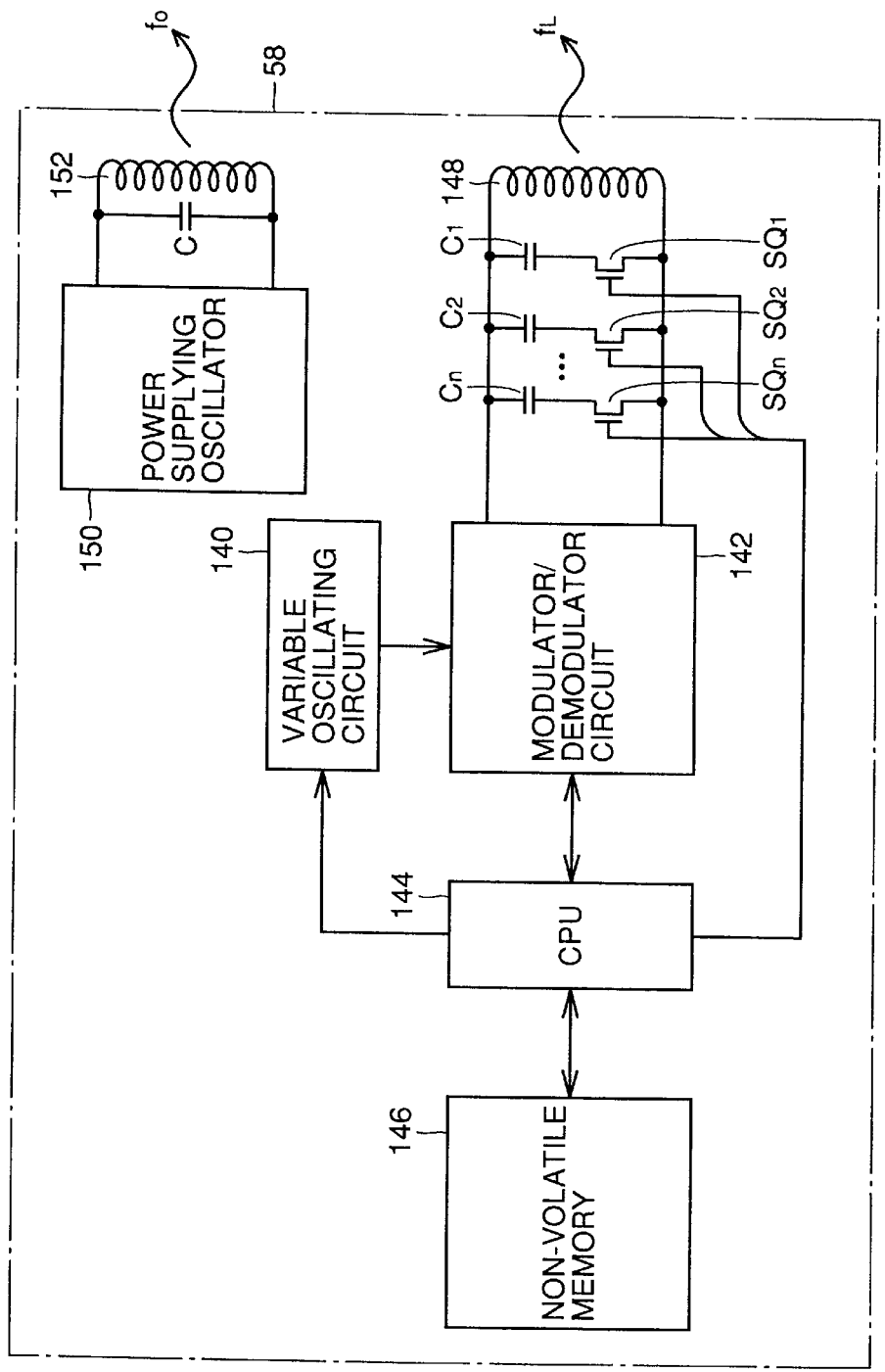
FIG. 20 is a diagram showing an example of a circuit block when the interrogator 90 of FIG. 19 is implemented as a non-contact type reader/writer 58.

FIG. 20 shows an example of a circuit diagram for interrogator 95 shown in FIG. 19, in the case where it is implemented as a non-contact type reader/writer 58. Reader/writer 58 is used in conjunction with the above-described IC card 18, to constitute an IC card communication system that performs power supply and data communication utilizing different electromagnetic waves having different frequencies.

In reader/writer 58, unmodulated, high-frequency carrier waves fo having a fixed frequency is generated at a power supplying oscillator 150, which are sent to IC card 18 via an antenna 152 of the resonance circuit designated for power supply. The carrier waves $f_0$, which are transmitted continuously while reader/writer 58 is in operation, are exclusively used to supply power to IC card 18.

Conversely, sent from antenna 148 of the resonance circuit designated for data communication are high-frequency carrier waves $f_L$ to be used exclusively for communication of processed data. CPU 144 determines at random the frequency of carrier waves $f_L$ utilizing a random-number generator (not shown), and designates the determined frequency to a variable oscillator 140 being the variable oscillating circuit. Variable oscillator 140 provides modulator/demodulator circuit 142 with the unmodulated carrier waves $f_L$ with the designated frequency.

CPU 144 performs operations corresponding to the determined frequency of carrier waves $f_L$. It also determines a conversion method to be used for conversion between the original and processed data. CPU 144 converts the original data to the processed data according to the determined conversion method. Carrier waves $f_L$ supplied to modulator/demodulator circuit 142 are modulated in accordance with the processed data converted at CPU 144 and sent out from antenna 148.

The processed data sent from IC card 18 are received at the resonance circuit for data communication, demodulated at modulator/demodulator circuit 142, and restored to the original data at CPU 144 according to the conversion method determined as above.

Furthermore, CPU 144 makes adjustment of the resonance frequency of the resonance circuit to a favorable resonance frequency that conforms to the determined frequency of carrier waves $f_L$. In the present embodiment, the resonance frequency of the resonance circuit is switched to match the determined frequency of carrier waves $f_L$. In other words, CPU 144 turns on and off transistors SQ1 to SQn in accordance with the determined frequency of carrier waves $f_L$. Accordingly, capacitors C1 to Cn can be selectively connected to the resonance circuit. The resonance frequency of the resonance circuit is thus switched.

As explained above, by adjusting the resonance frequency of the resonance circuit to the favorable resonance frequency that conforms to the determined frequency of carrier waves $f_L$, it is possible to efficiently communicate the processed data even if changes occur in the carrier waves $f_L$ for data communication.

The operation of the IC card system provided with IC card 18 (see FIG. 12) and reader/writer 58 (see FIG. 20) as described above will now be described with reference to the flow charts shown in FIGS. 21 and 22. CPU 144 in reader/writer 58 first determines the frequency of carrier waves $f_L$ to be utilized for data communication (step S50).

In the present embodiment, it is assumed that three systems shown in FIG. 3 are prepared as the systems for conversion between original and processed data, and thus, three kinds of frequencies of carrier waves $f_L$ for data communication are prepared corresponding to these conversion methods.

For example, if the carrier waves $f_0$ designated for power supply is at 13.56 MHz, three kinds of frequencies that are different therefrom, e.g., 1.7 MHz, 3.39 MHz, and 6.8 MHz can be set as candidate frequencies of carrier waves $f_L$ for data communication.

CPU 144 selects one of these three frequencies at random and determines it as a frequency of carrier waves $f_L$. The process performed by the frequency determination unit corresponds to step S50.

Alternatively, it is also possible to select the frequency of carrier waves $f_L$ from these three frequencies in a predetermined order, instead of selecting at random.

Next, CPU 144 sets the resonance frequency of the resonance circuit to a resonance frequency that is favorable for the determined frequency of carrier waves $f_L$ (step S51).

Setting of the resonance frequency is performed by turning on and off transistors SQ1 to SQn. The processes to be performed by the resonance frequency setting unit of the interrogator correspond to step S51.

CPU 144 then sends out a response signal being carrier waves $f_L$ modulated to a prescribed pattern (step S52). It also determines the conversion method for conversion between the original and processed data, corresponding to the frequency of carrier waves $f_L$ determined in step S50 (step S53).

When IC card 18 approaches reader/writer 58, IC card 18 receives carrier waves $f_0$ for power supply, and thus activated. It also receives the response signal being carrier waves $f_L$ modulated to the prescribed pattern (step S54). The response signal is demodulated at demodulation circuit 66 and taken into CPU 68.

When CPU 68 determines that the signal received is the response signal, it performs the above-described resonance frequency adjustment process on the resonance circuit for data communication at the IC card side (step S55, see FIGS. 13 and 14). The processes performed by the resonance frequency setting unit of the responsor correspond to step S51.

CPU 68 detects the frequency of carrier waves $f_L$ that was received from the resonance circuit designated for data communication, with respect to the frequency of carrier waves $f_0$ that was obtained from the resonance circuit designated for power supply (step S56). It then determines the conversion method for conversion between the original and processed data in accordance with the detected frequency of carrier waves $f_L$ (step S57). The processes performed by the frequency detecting unit correspond to step S56.

Here, the correlation between the frequency of carrier waves $f_L$ and the conversion method in IC card 18 is set to be the same as the correlation between the frequency of carrier waves $f_L$ and the conversion method in reader/writer 58. Thus, it is guaranteed that the both IC card 18 and reader/writer 58 designate the same conversion method.

Next, CPU 68 returns a reply signal for the response signal to reader/writer 58 (step S58). This transmission of the reply signal is performed by modulating the unmodulated carrier waves $f_L$ sent from reader/writer 58 at a prescribed pattern. For the modulation of carrier waves $f_L$, the resonance frequency of the resonance circuit designated for data communication is switched among a favorable switched state and other switched states according to a prescribed pattern under the control of CPU 68, while reader/writer 58 outputs the unmodulated carrier waves $f_L$. In this manner, by changing impedance seen from reader/writer 58 side, the amplitude of carrier waves $f_L$ can be altered, and thus, it is possible to transmit the reply signal to reader/writer 58.

When receiving the reply signal (step S59), reader/writer 58 takes original data out of non-volatile memory 146, and converts the original data to processed data in accordance with the conversion method determined in step S53 (step S60). Reader/writer 58 modulates the converted, processed data by modulator/demodulator circuit 142 for application to IC card 18 (step S61).

IC card 18 receives the processed data transmitted (step S62). The processed data thus received are demodulated by demodulation circuit 66 and supplied to CPU 68. CPU 68 restores the received, processed data to the original data according to the conversion method determined in step S57 (step S63), and writes the restored data into non-volatile memory 70 (step S64).

CPU 68 in IC card 18 performs a prescribed process according to the restored, original data, and then reads out of the non-volatile memory 70 the original data to be transmitted (step S65). CPU 68 converts the original data to the processed data according to the conversion method above (step S66), and transmits the processed data to reader/writer 58 (step S67).

CPU 144 in reader/writer 58 receives the processed data sent from IC card 18 (step S68), and restores the processed data to the original data according to the conversion method determined in step S53 (step S69). It performs a prescribed process according to the restored original data.

As in the steps S60 to S62 described above, CPU 144 converts the original data to the processed data according to the conversion method determined in step S53 (step S70), and transmits the processed data to IC card 18 (step S71). IC card 18 receives the processed data transmitted (step S72). Thereafter, returning to step S63, IC card 18 and reader/writer 58 repeat the same processes.

In the present embodiment, once a conversion method is designated, the same conversion method is used until the end of a single period of communication. Alternatively, it is possible to have a configuration in which a new frequency of carrier waves $f_L$ for data communication is selected and thus a new conversion method corresponding thereto is designated for every return of data. With such a configuration, the safety on data security can be improved. Furthermore, it is also possible to have a configuration in which selection of the frequency of carrier waves $f_L$ and hence determination of a new conversion method is made for every few returns of data communicated.

Fifth Embodiment

Figure 21:
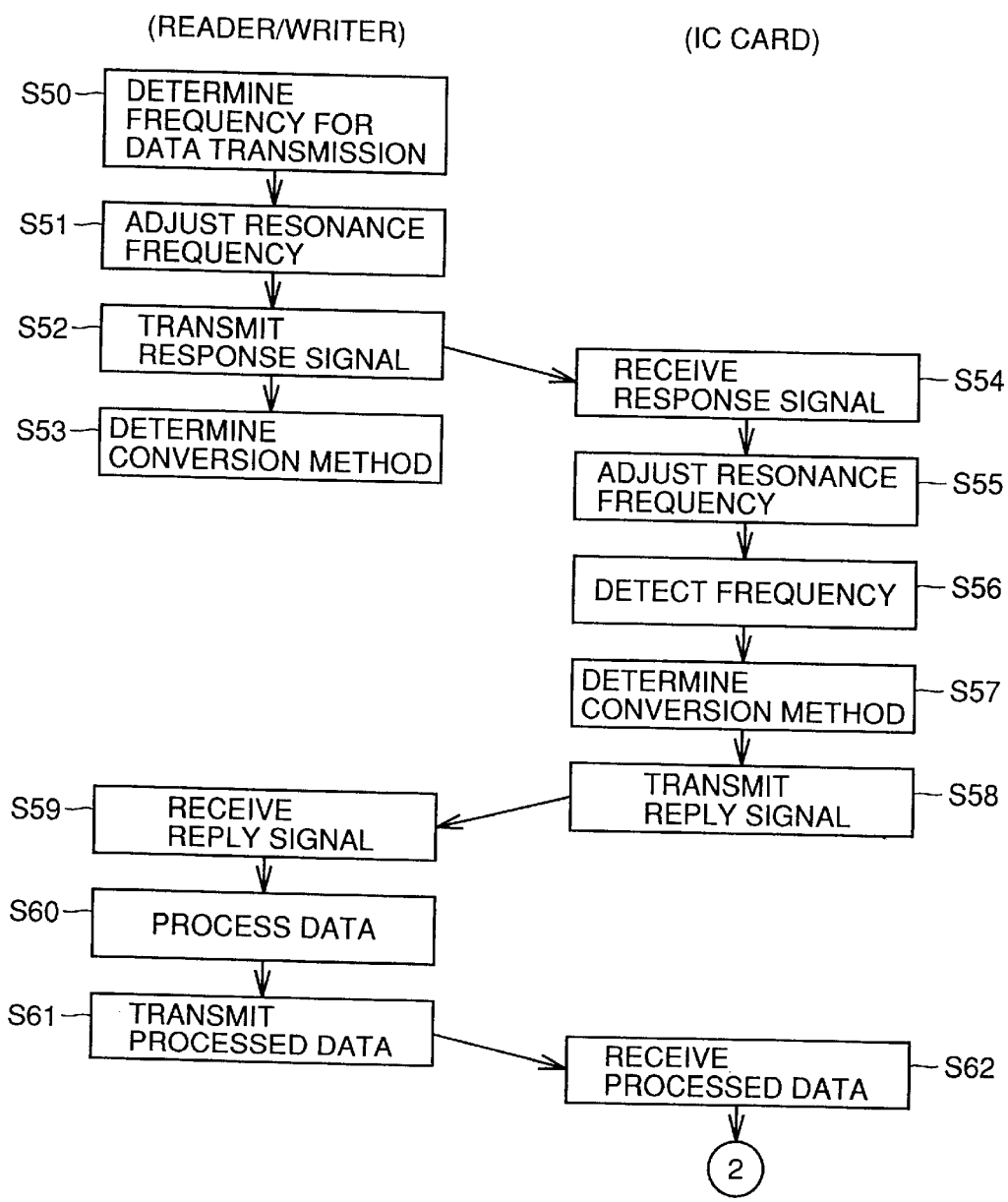
FIG. 21 is a flow chart illustrating an operation of the IC card system comprising IC card 18 and reader/writer 58.
Figure 22:
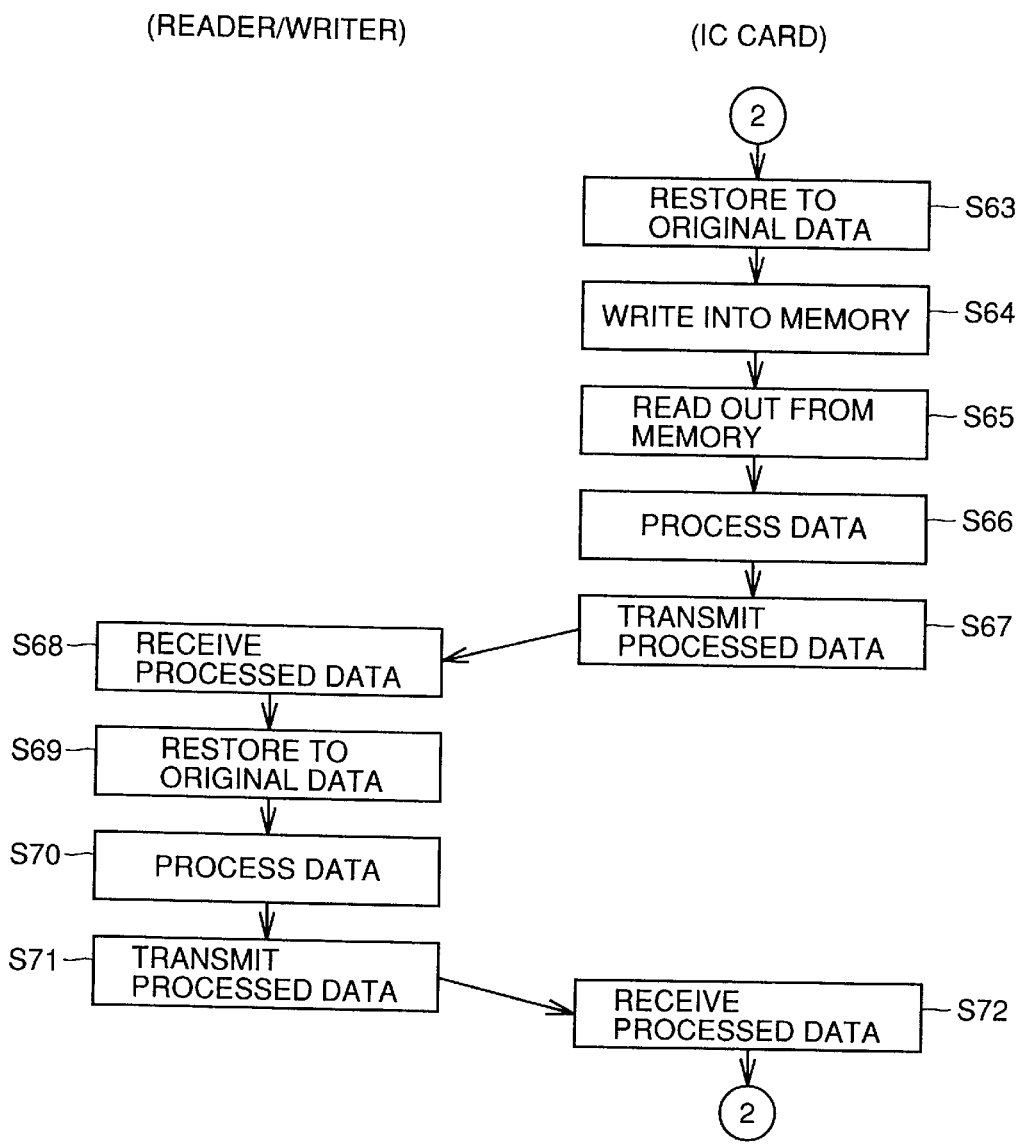
FIG. 22 is a flow chart illustrating an operation of the IC card system comprising IC card 18 and reader/writer 58.

In the above-described embodiment, as shown in FIG. 10 and steps S55 to S57 in FIG. 21, the resonance frequency of resonance circuit 40 in responsor 80 is first adjusted, the frequency of the electromagnetic waves is detected via thus adjusted resonance circuit 40, and then the conversion method to be used is selected based on the detected frequency of the electromagnetic waves. However, it is also possible to have a configuration in which the resonance frequency of resonance circuit 40 in responsor 80 is adjusted, and then, the conversion method is selected based on the thus adjusted resonance frequency of resonance circuit 40.

Figure 23:
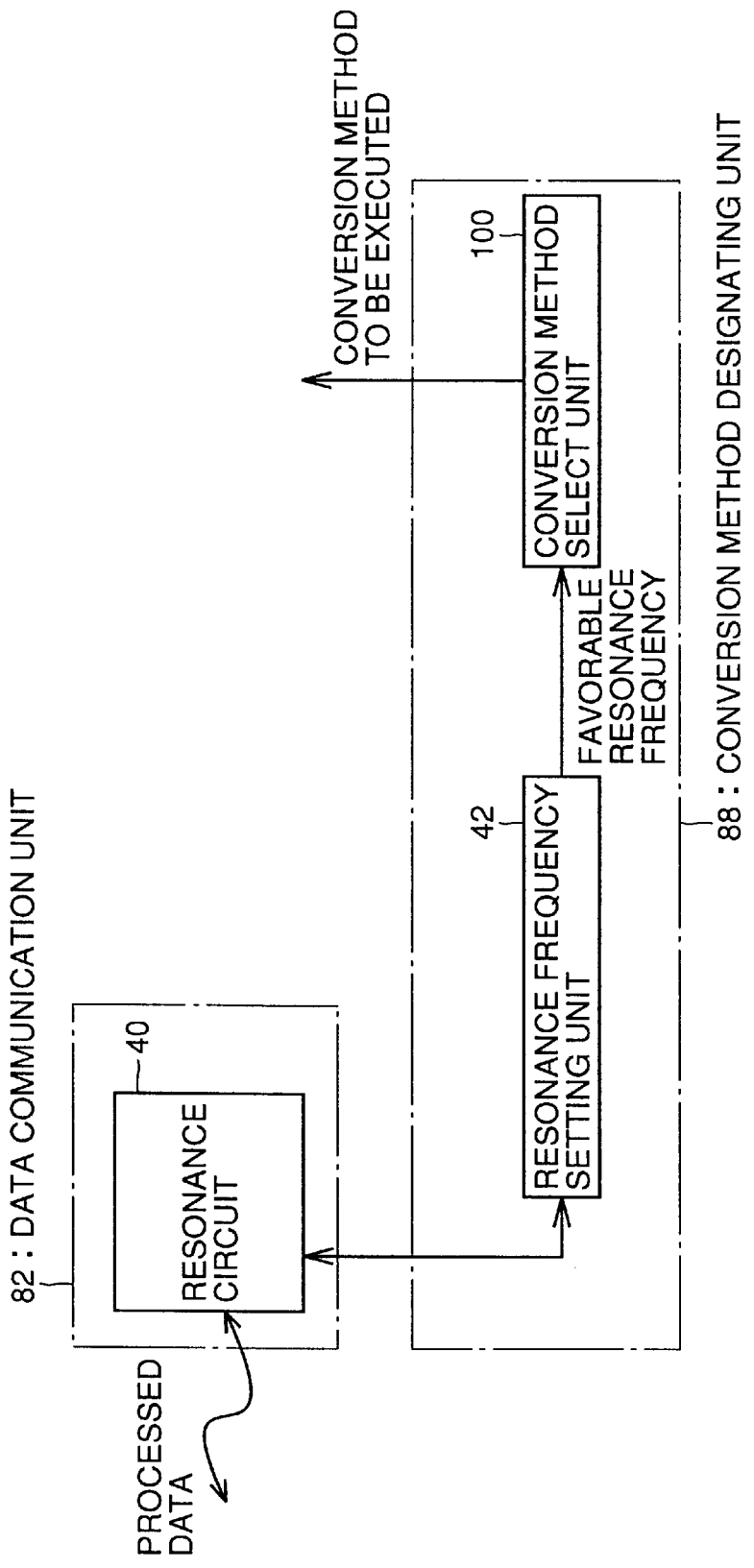
FIG. 23 is a diagram showing another configuration of responsor 80 shown in FIG. 1.

FIG. 23 illustrates a configuration of responsor 80 shown in FIG. 1, in the case where it is applied to such an embodiment. In this responsor 80, data communication unit 82 includes, as in the case of FIG. 10, resonance circuit 40 which has an antenna for performing data communication or power transmission utilizing the electromagnetic waves and of which a resonance frequency can be switched by a switching unit.

Conversion method designating unit 88 includes a resonance frequency setting unit 42, and a conversion method select unit 100 that selects a conversion method to be executed corresponding to a favorable resonance frequency of resonance circuit 40 obtained by resonance frequency setting unit 42. The resonance frequency setting unit 42 is identical to that in FIG. 10. Such a configuration is convenient in that frequency detecting unit 102 as shown in FIG. 10 is unnecessary and thus the configuration can be simplified. It should be understood that data converting unit 84 and data storing unit 86 are similar to those in FIG. 2, and thus, description thereof is not repeated.

Sixth Embodiment

In the embodiment shown in FIG. 10, the resonance frequency of resonance circuit 40 in responsor 80 is first adjusted, and then the frequency of the electromagnetic waves is detected via the adjusted resonance circuit 40 (see steps S55 and S56 in FIG. 20). If a highly sensitive frequency detecting unit 102 is available, however, it is possible to detect the frequency of the electromagnetic waves first, and then, based on the detected frequency of the electromagnetic waves, to adjust the resonance frequency of resonance circuit 40 of responsor 80.

Figure 24:
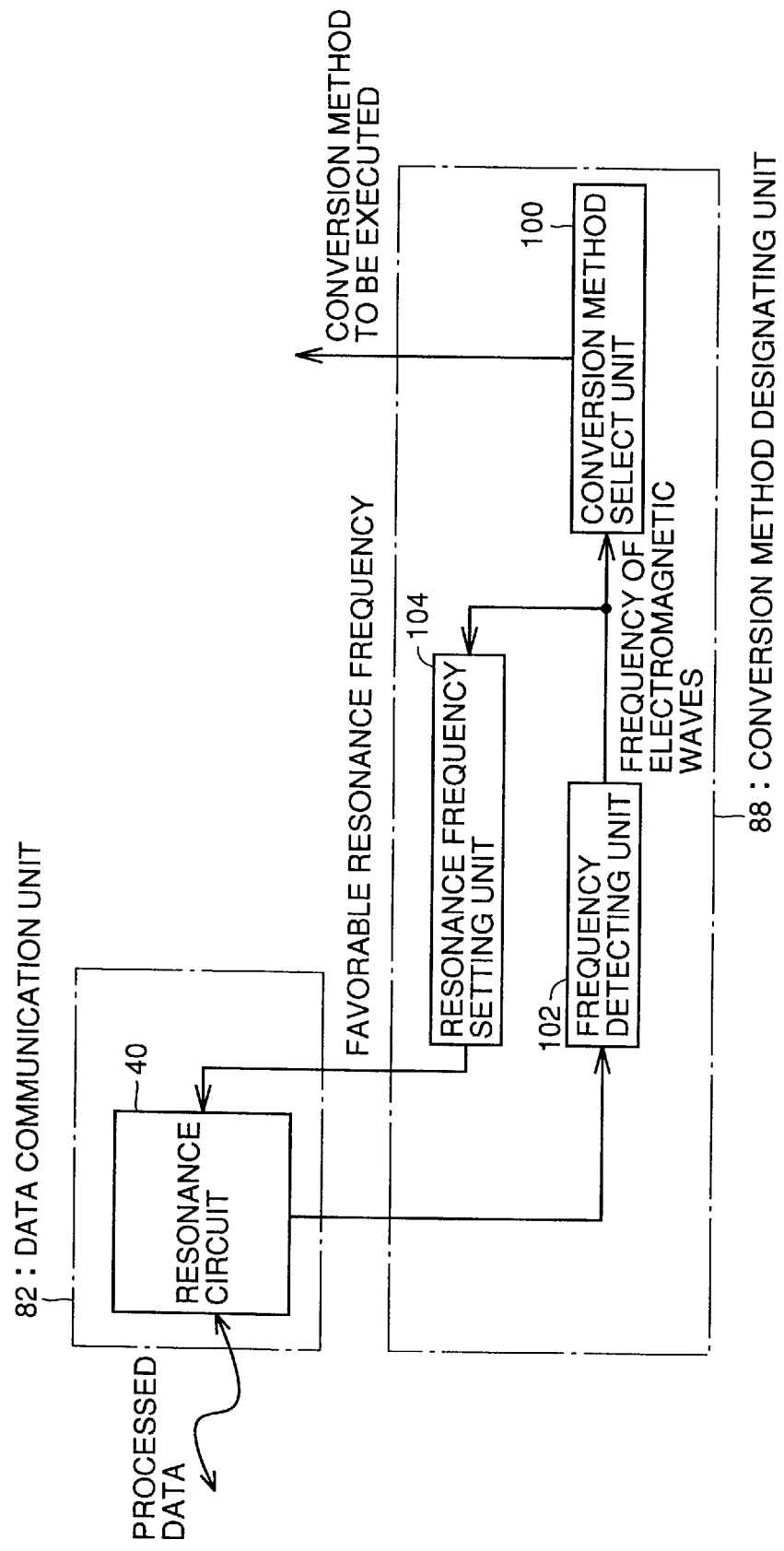
FIG. 24 is a diagram showing a further configuration of responsor 80 shown in FIG. 1.
Figure 25:
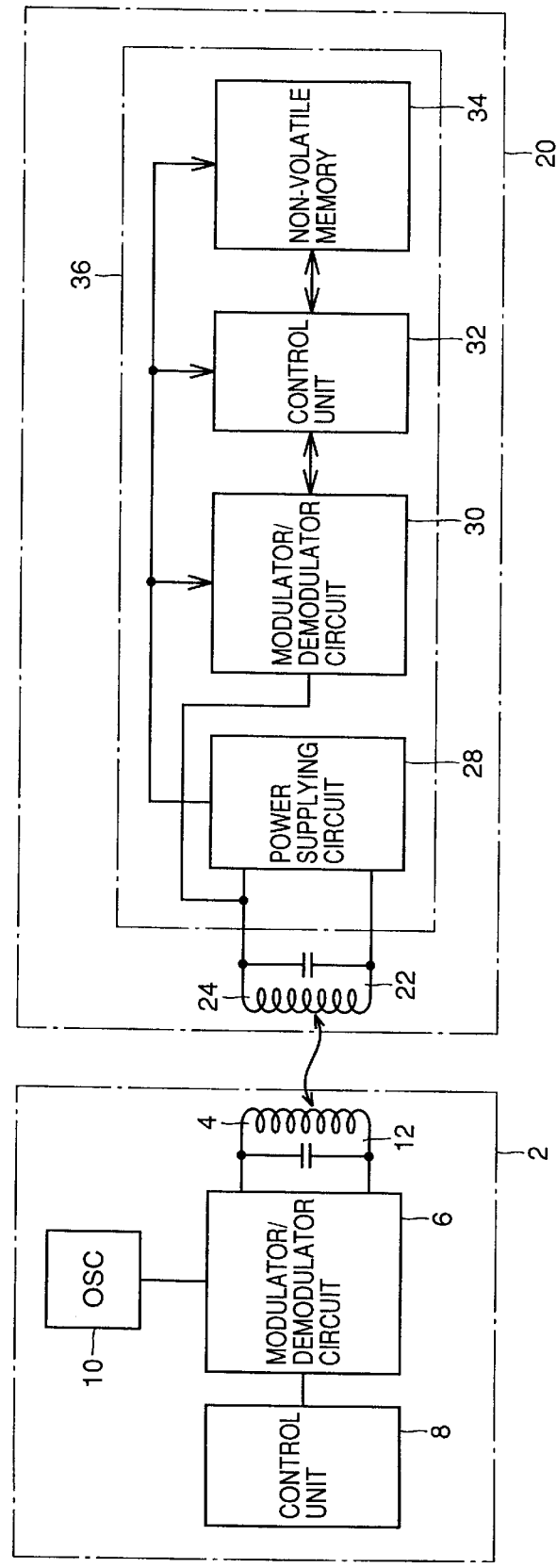
FIG. 25 is a diagram showing a configuration of a conventional, non-contact type data communication system.

FIG. 24 illustrates a configuration of responsor 80 shown in FIG. 1, which is applied to this embodiment. In this responsor 80, data communication unit 82 has a configuration identical to that in FIG. 10.

Conversion method designating unit 88 includes: a frequency detecting unit 102 that detects the frequency of the electromagnetic waves; a resonance frequency setting unit 104 that uses a switching unit to set, based on the frequency of the electromagnetic waves detected by frequency detecting unit 102, the resonance frequency of resonance circuit 40 to a favorable resonance frequency that corresponds to the detected frequency of the electromagnetic waves; and a conversion method select unit 100 that selects a conversion method to be executed corresponding to the frequency of the electromagnetic waves detected by frequency detecting unit 102.

Thus, in the case where a frequency detecting unit 102 exhibiting good sensitivity is available, a resonance frequency setting unit 104 with a simple configuration can be used conveniently, instead of the complicated resonance frequency setting unit 42 as shown in FIG. 10. This simplifies the configuration of the apparatus.

In each embodiment described above, pulse-amplitude modulation is conducted to modulate carrier waves for data communication. However, any other modulation techniques, such as pulse-frequency modulation, pulse-phase modulation, analog-amplitude modulation, analog-frequency modulation, and analog-phase modulation, may also be used for the same purpose.

Furthermore, each embodiment above is described as either a data communication apparatus (system) that is capable of communicating with another data communication apparatus utilizing electromagnetic waves shared for both data communication and power transmission, or a data communication apparatus (system) that is capable of communicating with another data communication apparatus utilizing both the electromagnetic waves designated for data communication and the electromagnetic waves designated for power transmission that are different in frequency from the electromagnetic waves designated for data communication. However, the present invention can also be applied to a data communication apparatus (system) that is capable of communicating in the both manners described above.

In addition, each embodiment above is described as a non-contact type data communication apparatus (system). However, this invention is applicable to a contact type data communication apparatus (system) that is capable of performing data communication or power transmission by electrically contacting with another data communication apparatus.

Moreover, the present invention can be applied to a contact/non-contact type data communication apparatus (system) that is capable of performing data communication or power transmission with an electrical contact with another data communication apparatus and also capable of performing data communication or power transmission utilizing electromagnetic waves, without contact with another data communication apparatus.

Still further, although each embodiment above is described by way of example as an IC card communication system including an IC card and a reader/writer, the present invention can be applied to any data communication apparatuses in general, not limited to the IC card communication system.

In this invention, the term "processed data" refers to data which are obtained from original data by any means, and from which the original data can be reconstructed.

The term "communication" is a concept including wire communication as well as radio communication.

The term "communication utilizing electromagnetic waves" refers to radio communication utilizing electromagnetism. The concept includes, in addition to the communication utilizing electronic waves, communication by electromagnetic coupling.

The term "characteristics of electromagnetic waves" refers to the characteristics that can be recognized in the electromagnetic waves. The concept includes physical characteristics of the electromagnetic waves per se, such as strength, frequency and phase thereof.

The term "switching unit" refers to a configuration that can switch connection states and constants of a circuit. It is not restricted to a mechanical configuration or an electrical configuration. This concept includes, not only digital switching, but also analogue, or successive, switching of constants such as resistance values. In the embodiments, this refers to transistors SQ1 to SQn in FIGS. 12 and 20.

The term "transistor" refers to an element of which turning on or off can be controlled by a control voltage (current) applied to a gate, base, or the like.

The term "antenna" refers to an element having inductance component necessary for receiving desirable electromagnetic waves, regardless of its appearance or its forming method. In the embodiments, it refers to copper wire wound into a coil as shown in FIG. 5. Other than this, it also includes, for example, an element printed on an IC chip surface, or an element formed as an aluminum interconnection layer within the IC chip.

The term "capacitor" refers to an element having electrostatic capacitance necessary for configuration of a resonance circuit with the above-described antenna, regardless of appearance or forming method thereof. In the embodiments, it refers to capacitors C1 to Cn shown in FIGS. 12 and 20. In some cases, stray capacitance of an antenna may be used as the capacitor.

The present invention has thus been described in detail. However, it is only by way of illustration, and should not be taken by way of limitation. It will be clearly understood that the spirit and scope of the present invention are limited only by the appended claims.

What is claimed is:

1. A data communication apparatus, comprising:
    data communication means (82) for performing communication of processed data with another data communication apparatus (90);
    conversion method designating means (88) for selecting and designating one of a plurality of conversion methods for conversion between original data and the processed data as a conversion method to be executed, corresponding to a prescribed condition that may be altered and can be commonly recognized with said another data communication apparatus; and
    data converting means (84) for converting the processed data obtained from said data communication means to the original data or converting the original data to the processed data for application to said data communication means, in accordance with the conversion method designated by said conversion method designating means;
    said data communication apparatus performing the conversion between the original data and the processed data in accordance with the same conversion method as used in said another data communication apparatus.

2. The data communication apparatus according to claim 1, wherein said data communication apparatus is capable of performing data communication or power transmission by electrically contacting with said another data communication apparatus.

3. The data communication apparatus according to claim 1, wherein
    said data communication apparatus is capable of performing data communication or power transmission in a non-contact manner with said another data communication apparatus utilizing electromagnetic waves, and
    said conversion method designating means designates said conversion method to be executed corresponding to a prescribed characteristic of said electromagnetic waves that may be altered and can be commonly recognized with said another data communication apparatus.

4. The data communication apparatus according to claim 3, wherein said conversion method designating means designates said conversion method to be executed corresponding to transmission intensity of the electromagnetic waves.

5. The data communication apparatus according to claim 4, wherein
    said data communication means includes a resonance circuit (40) having an antenna for performing data communication or power transmission utilizing the electromagnetic waves, and
    said conversion method designating means measures magnitude of output of the resonance circuit corresponding to a level of the electromagnetic waves, and designates said conversion method to be executed corresponding to the measured magnitude of the output of the resonance circuit.

6. The data communication apparatus according to claim 5, wherein said conversion method designating means includes
    reference voltage generating means (50) for obtaining a constant reference voltage regardless of voltage fluctuation appealing in said resonance circuit,
    output value measuring means (52) for measuring the magnitude of the output of the resonance circuit based on the reference voltage obtained by said reference voltage generating means, and
    conversion method select means (100) for selecting said conversion method to be executed corresponding to the magnitude of the output of the resonance circuit obtained by said output value measuring means.

7. The data communication apparatus according to claim 3, wherein said conversion method designating means designates said conversion method to be executed corresponding to a frequency of the electromagnetic waves.

8. The data communication apparatus according to claim 7, wherein
    said data communication means includes a resonance circuit having an antenna for performing data communication or power transmission utilizing the electromagnetic waves and having a resonance frequency that can be switched by switching means, and
    said conversions system designating means includes resonance frequency setting means that uses said switching means to set the resonance frequency of the resonance circuit to a favorable resonance frequency corresponding to the frequency of said electromagnetic waves.

9. The data communication apparatus according to claim 8, wherein
said conversion method designating means includes
frequency detecting means (102) for detecting the frequency of the electromagnetic waves and
conversion method select means (100) for selecting said conversion method to be executed corresponding to the frequency of the electromagnetic waves detected by the frequency detecting means, and
said resonance frequency setting means sets the resonance frequency of the resonance circuit based on the frequency of the electromagnetic waves detected by said frequency detecting means.

10. The data communication apparatus according to claim 7, wherein said data communication apparatus is capable of either
receiving, from said another data communication apparatus, the electromagnetic waves that are utilized for both the data communication and the power transmission, or
receiving, from said another data communication apparatus, both of the electromagnetic waves utilized for the data communication and the electromagnetic waves utilized for the power transmission different in frequency from the electromagnetic waves utilized for the data communication.

11. The data communication apparatus according to claim 7, wherein said data communication apparatus is capable of either
sending, with respect to said another data communication apparatus, electromagnetic waves to be used for both the data communication and the power transmission, or
sending, to said another data communication apparatus, both of the electromagnetic waves to be used for the data communication and the electromagnetic waves to be used for the power transmission with a frequency different from the frequency of said electromagnetic waves to be used for the data communication.

12. The data communication apparatus according to claim 7, wherein said data converting means prepares as the conversion method for conversion between the original data and the processed data, at least two conversion methods including the following systems to be used independently or as a combination thereof:
(a1) a dummy data inserting system in which dummy data are inserted between the original data to obtain the processed data,
(a2) a bit inverting system in which a prescribed bit of the original data is inverted to obtain the processed data, and
(a3) a data dividing system in which the original data are divided to obtain the process data.

13. The data communication apparatus according to claim 7, wherein
said data communication apparatus is either one of an interrogator or a responsor of an IC card communication system, and
said another data communication apparatus is the other one of the interrogator or the responsor of the IC card communication system.

14. The data communication apparatus according to claim 8, wherein said resonance frequency setting means receives an output signal from the resonance circuit at each switched state while the resonance frequency of said resonance circuit is being switched using said switching means, and sets the switched state of the switching means such that a desirable output signal can be obtained.

15. The data communication apparatus according to claim 8, wherein said switching means includes a plurality of transistors.

16. The data communication apparatus according to claim 8, wherein said resonance circuit is able to use the switching means to select capacitance coupled to the antenna.

17. The data communication apparatus according to claim 8, wherein said resonance circuit uses the switching means to selectively change inductance of the antenna connected to a capacitor.

18. The data communication apparatus according to claim 14, wherein said resonance frequency setting means includes
judgement means (44) for obtaining a voltage or a current appearing in said resonance circuit at each switched state while sequentially switching the switched states of said resonance circuit, and obtaining a favorable switched state of the switching means with which a desirable voltage or current is obtained, and
switched state storing means (46) for storing the favorable switched state obtained by said judgement means.

19. The data communication apparatus according to claim 18, wherein said judgement means includes
reference voltage generating means (50) for obtaining a constant reference voltage regardless of voltage fluctuation appearing in said resonance circuit,
output value measuring means (52) for measuring magnitude of output of said resonance circuit at each switched state based on the reference voltage from the reference voltage generating means, and
state determination means (56) for determining the favorable switched state based on the magnitude of the output obtained by said output value measuring means.

20. The data communication apparatus according to claim 18, wherein
said judgement means further includes output storing means (54) for storing the output value of the resonance circuit corresponding to each switched state of the switching means, by relating the output value to each switched state, and
said state determination means determines the favorable switched state based on the output value stored in said output value storing means.

21. The data communication apparatus according to claim 18, wherein said judgement means selects a switched state corresponding to the largest output value as the favorable switched state.

22. The data communication apparatus according to claim 18, wherein said judgement means receives the output value every time the switched state is switched sequentially, and when receiving an output value that exceeds a prescribed threshold value, selects the relevant switched state as the favorable switched state.

23. The data communication apparatus according to claim 14, wherein said conversion method designating means includes conversion method select means for selecting said conversion method to be executed corresponding to the favorable resonance frequency of said resonance circuit obtained by said resonance frequency setting means.

24. The data communication apparatus according to claim 14, wherein said conversion method designating means includes
frequency detecting means (102) for detecting the frequency of said electromagnetic waves obtained via said resonance circuit set at the favorable resonance frequency by said resonance frequency setting means, and
conversion method select means (100) for selecting said conversion method to be executed corresponding to the frequency of the electromagnetic waves detected by said frequency detecting means.

25. The data communication apparatus according to claim 3, wherein said data communication apparatus is capable of either receiving, from said another data communication apparatus, the electromagnetic waves that are utilized for both the data communication and the power transmission, or receiving, from said another data communication apparatus, both of the electromagnetic waves utilized for the data communication and the electromagnetic waves utilized for the power transmission different in frequency from the electromagnetic waves utilized for the data communication.

26. The data communication apparatus according to claim 25, wherein said data communication apparatus is a data communication apparatus having no power supply source provided therein, that is capable of receiving, from said another data communication apparatus, both of the electromagnetic waves utilized for data communication and having a variable frequency and the electromagnetic waves utilized for power transmission and having a fixed frequency that is different from the frequency of said electromagnetic waves utilized for the data communication, and said conversion method designating means designates said conversion method to be executed corresponding to the frequency of the electromagnetic waves utilized for the data communication.

27. The data communication apparatus according to claim 25, wherein said data communication apparatus is a data communication apparatus capable of receiving, from said another data communication apparatus, both of said electromagnetic waves utilized for the data communication and said electromagnetic waves utilized for the power transmission, either one of said electromagnetic waves utilized for the data communication and said electromagnetic waves utilized for the power transmission being electromagnetic waves having a fixed frequency, and the other one being electromagnetic waves having a variable frequency, and said conversion method designating means detects the frequency of the electromagnetic waves having the variable frequency based on the frequency of the electromagnetic waves having the fixed frequency, and designates said conversion method to be executed corresponding to the detected frequency.

28. The data communication apparatus according to claim 3, wherein said data communication apparatus is capable of either sending, with respect to said another data communication apparatus, electromagnetic waves to be used for both the data communication and the power transmission, or sending, to said another data communication apparatus, both of the electromagnetic waves to be used for the data communication and the electromagnetic waves to be used for the power transmission with a frequency different from the frequency of said electromagnetic waves to be used for the data communication.

29. The data communication apparatus according to claim 28, wherein said data communication apparatus is a data communication apparatus capable of sending, to said another data communication apparatus, both of the electromagnetic waves to be used for the data communication and having a variable frequency and the electromagnetic waves to be used for the power transmission and having a fixed frequency that is different from the frequency of said electromagnetic waves to be used for the data communication, and said conversion method designating means designates said conversion method to be executed corresponding to the frequency of the electromagnetic waves to be used for the data communication.

30. The data communication apparatus according to claim 28, wherein said electromagnetic waves to be used for the data communication and for the power transmission include at least one of the electromagnetic waves used for the data communication and the electromagnetic waves used for the power transmission having a variable frequency, and said conversion method designating means includes frequency determination means for determining the frequency of the electromagnetic waves having said variable frequency according to a prescribed determination system, and selects said conversion method to be executed corresponding to the variable frequency of the electromagnetic waves determined by the frequency determination means.

31. The data communication apparatus according to claim 30, wherein said data communication means includes a resonance circuit having an antenna for performing data communication or power transmission utilizing electromagnetic waves and having a resonance frequency that can be switched by switching means, and a variable oscillating circuit that is an oscillating circuit of a variable frequency for giving electrical oscillation to the resonance circuit by performing oscillation of the frequency determined by said frequency determination means, and said conversion method designating means includes resonance frequency setting means that uses said switching means to set the resonance frequency of the resonance circuit to a favorable resonance frequency that corresponds to the frequency of the electromagnetic waves determined by said frequency determination means.

32. The data communication apparatus according to claim 30, wherein said frequency determination means is characterized by determining said variable frequency of the electromagnetic waves at random.

33. The data communication apparatus according to claim 1, wherein said data communication apparatus is either one of an interrogator or a responsor of an IC card communication system, and said another data communication apparatus is the other one of the interrogator or the responsor of the IC card communication system.

34. The data communication apparatus according to claim 1, wherein said data converting means prepares as the conversion method for conversion between the original data and the processed data, at least two conversion methods including the following systems to be used independently or as a combination thereof:

(a1) a dummy data inserting system in which dummy data are inserted between the original data to obtain the processed data, (a2) a bit inverting system in which a prescribed bit of the original data is inverted to obtain the processed data, and (a3) a data dividing system in which the original data are divided to obtain the process data.

35. A data communication system performing communication of processed data between a data communication apparatus and another data communication apparatus, wherein said data communication apparatus includes
first data communication means for performing communication of the processed data with said another data communication apparatus,
first conversion method designating means for selecting and designating one of a plurality of conversion methods for conversion of the original data and the processed data as a conversion method to be executed, corresponding to a prescribed condition that may be altered and can be commonly recognized with said another data communication apparatus, and
first data converting means for converting the processed data obtained from the data communication means to the original data or converting the original data to the processed data for application to said first data communication means, according to the conversion method designated by said first conversion method designating means, and said another data communication apparatus includes
second data communication means for performing communication of the processed data with said data communication apparatus,
second conversion method designating means for selecting and designating one of a plurality of conversion methods for conversion of the original data and the processed data as a conversion method to be executed, corresponding to said prescribed condition, and second data converting means for converting the processed data obtained from said second data communication means to the original data or converting the original data to the processed data for application to said second data communication means, according to the conversion method designated by said second conversion method designating means, the conversion method designated in said data communication apparatus and the conversion method designated in said another data communication apparatus being made same.

36. A data communication method for performing communication of processed data between at least two data communication apparatuses, comprising the steps of:

selecting and designating one of a plurality of conversion methods for conversion of original data and the processed data as a conversion method to be executed, corresponding to a prescribed condition that may be altered and can be commonly recognized between respective data communication apparatuses;

converting the processed data obtained from another data communication apparatus to the original data or converting the original data to the processed data for application to the another data communication apparatus, according to the designated conversion method; and allocating a same conversion method as the conversion method designated for each data communication apparatus.

* * * * *